(12) United States Patent
Knox et al.

(10) Patent No.: US 10,601,887 B2
(45) Date of Patent: Mar. 24, 2020

(54) STREAM HANDLING USING AN INTERMEDIATE FORMAT

(71) Applicant: Akamai Technologies, Inc., Cambridge, MA (US)

(72) Inventors: Christopher R. Knox, San Diego, CA (US); Philip A. Lisiecki, Santa Barbara, CA (US); James Mutton, Maple Valley, WA (US); Chuck Bernard, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 15/660,425

(22) Filed: Jul. 26, 2017

(65) Prior Publication Data

US 2017/0324796 A1 Nov. 9, 2017

Related U.S. Application Data

(63) Continuation of application No. 12/978,431, filed on Dec. 24, 2010, now abandoned.
(Continued)

(51) Int. Cl.
*H04L 29/06* (2006.01)
*H04L 29/08* (2006.01)

(52) U.S. Cl.
CPC ........ *H04L 65/605* (2013.01); *H04L 65/4084* (2013.01); *H04L 65/607* (2013.01); *H04L 67/289* (2013.01); *H04L 67/2823* (2013.01)

(58) Field of Classification Search
CPC ......... H04N 21/8456; H04N 21/23106; H04N 21/2747; H04N 21/2343; H04N 21/85406;
(Continued)

(56) References Cited

U.S. PATENT DOCUMENTS 9,537,967 B2 * 1/2017 Knox .................... H04L 65/605
2004/0166834 A1 * 8/2004 Omar .................... H04L 29/06
455/414.1

(Continued)

*Primary Examiner* — William G Trost, IV
*Assistant Examiner* — Imran Moorad
(74) *Attorney, Agent, or Firm* — David H. Judson

(57) ABSTRACT

A method of delivering a live stream is implemented within a content delivery network (CDN) and includes the high level functions of recording the stream using a recording tier, and playing the stream using a player tier. The step of recording the stream includes a set of sub-steps that begins when the stream is received at a CDN entry point in a source format. The stream is then converted into an intermediate format (IF), which is an internal format for delivering the stream within the CDN and comprises a stream manifest, a set of one or more fragment indexes (FI), and a set of IF fragments. The player process begins when a requesting client is associated with a CDN HTTP proxy. In response to receipt at the HTTP proxy of a request for the stream or a portion thereof, the HTTP proxy retrieves (either from the archive or the data store) the stream manifest and at least one fragment index. Using the fragment index, the IF fragments are retrieved to the HTTP proxy, converted to a target format, and then served in response to the client request. The source format may be the same or different from the target format. Preferably, all fragments are accessed, cached and served by the HTTP proxy via HTTP.

8 Claims, 10 Drawing Sheets

Related U.S. Application Data

(60) Provisional application No. 61/290,263, filed on Dec. 28, 2009.

(58) Field of Classification Search
CPC ..... H04N 21/234309; H04N 21/23439; H04N 21/2181; H04N 19/40; H04L 67/02; H04L 67/26; H04L 29/06027; H04L 67/288; H04L 63/0281; H04L 63/0464; H04L 65/4084; H04L 67/28; H04L 67/146; H04L 67/2842; H04W 4/18; H04W 88/181
USPC .......................................................... 709/231
See application file for complete search history.

(56) References Cited

U.S. PATENT DOCUMENTS

| | | | |
|---|---|---|---|
| 2004/0170155 A1* | 9/2004 | Omar | H04L 29/12009 370/349 |
| 2005/0160161 A1* | 7/2005 | Barrett | H04L 63/0281 709/223 |
| 2009/0106288 A1* | 4/2009 | Yang | H04N 7/17318 |
| 2010/0118982 A1* | 5/2010 | Chatterjee | H04N 19/61 375/240.29 |
| 2011/0083037 A1* | 4/2011 | Bocharov | H04N 21/23116 714/4.11 |
| 2012/0191805 A1* | 7/2012 | Fee | H04N 21/2343 709/217 |

\* cited by examiner

FRAGMENT INDEX 12:00:00-12:05:00

| KF TIME | FRAG # | OFFSET | SEEK TIME |
|---|---|---|---|
| 11:59:56.200 | 3 | 17111 | — |
| 11:59:58.200 | 3 | 19123 | — |
| 12:00:00.100 | 3 | 24333 | 12:00:00 |
| 12:00:02.100 | 3 | 28000 | 12:00:02 |
| 12:00:04.100 | 4 | 200 | 12:00:04 |
| 12:00:04.100 | 4 | 200 | 12:00:06 |
| 12:00:04.100 | 4 | 200 | 12:00:08 |
| 12:00:10.100 | 4 | 7800 | 12:00:10 |
| 12:00:10.200 | 4 | 8233 | 12:00:12 |
| 12:00:10.300 | 5 | 200 | 12:00:14 |
| 12:00:12.300 | 5 | 1585 | 12:00:16 |
| ... | ... | ... | ... |
| | | | 12:04:58 |
| | | | — |
| | | | — |

OVERLAP FROM PREVIOUS INDEX (=2)

LONG KF MUST BE REPEATED

SHORT KF INTERVAL ALLOWED DUE TO FUZZINESS (=2)

FUZZINESS EXCEEDED: DROP KFs BETWEEN 12:00:10.300 AND 12:00:12.000 FROM INDEX (THEY ARE STILL KFs, BUT WE CANNOT *SEEK* TO THEM)

FIXED-LENGTH RECORDS IN INDEX

NOT STORED IN INDEX, BUT IMPLIED BY minKeyFrameInterval AND keyFrameIntervalOverlap $$\left\lfloor \frac{seek\_time \bmod indexFileDuration}{minKeyFrameInterval} \right\rfloor + keyFrameIntervalOverlap + indexFuzziness + 1$$

(START ONE EARLIER IF YOU WANT TO SEEK TO THE KF THAT INCLUDES *seek_time* INSTEAD OF THE ONE FOLLOWING *seek_time*)

*FIG. 13*

STREAM HANDLING USING AN INTERMEDIATE FORMAT

BACKGROUND OF THE INVENTION

Technical Field

This application relates generally to delivery online of high definition (HD) video at broadcast audience scale to popular runtime environments and mobile devices.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS query handling, provisioning, data monitoring and reporting, content targeting, personalization, and business intelligence.

While content delivery networks provide significant advantages, typically they include dedicated platforms to support delivery of content for multiple third party runtime environments that are, in turn, based on their own proprietary technologies, media servers, and protocols. These distinct platforms are costly to implement and to maintain, especially globally and at scale as the number of end users increases. Moreover, at the same time, content providers (such as large-scale broadcasters, film distributors, and the like) desire their content to be delivered online in a manner that complements traditional mediums such as broadcast TV (including high definition or "HD" television) and DVD. This content may also be provided at different bit rates. End users also desire to interact with the content as they can do now with traditional DVR-based content delivered over satellite or cable. A further complication is that Internet-based content delivery is no longer limited to fixed line environments such as the desktop, as more and more end users now use mobile devices such as the Apple® iPhone® to receive and view content over mobile environments.

Thus, there is a need to provide an integrated content delivery network platform with the ability to deliver online content (such as HD-quality video) at broadcast audience scale to the most popular runtime environments (such as Adobe® Flash®, Microsoft® Silverlight®, etc.) as well as to mobile devices such as the iPhone to match what viewers expect from traditional broadcast TV. The techniques disclosed herein address this need.

BRIEF SUMMARY

An integrated HTTP-based delivery platform that provides for the delivery online of HD-video and audio quality content to popular runtime environments operating on multiple types of client devices in both fixed line and mobile environments.

In one embodiment, a method of delivering a live stream is implemented within a content delivery network (CDN) and includes the high level functions of recording the stream using a recording tier, and playing the stream using a player tier. The step of recording the stream includes a set of sub-steps that begins when the stream is received at a CDN entry point in a source format. The stream is then converted into an intermediate format (IF), which is an internal format for delivering the stream within the CDN and comprises a stream manifest, a set of one or more fragment indexes (FI), and a set of IF fragments. The fragments representing a current portion of the stream are archived in the intermediate format in an archiver, while older (less current) portions are sent to data store. The player process begins when a requesting client is associated with a CDN HTTP proxy. In response to receipt at the HTTP proxy of a request for the stream or a portion thereof, the HTTP proxy retrieves (either from the archive or the data store) the stream manifest and at least one fragment index. Using the fragment index, the IF fragments are retrieved to the HTTP proxy, converted to a target format, and then served in response to the client request. The source format may be the same or different from the target format. Preferably, all fragments are accessed, cached and served by the HTTP proxy via HTTP.

In another embodiment, a method of delivering a stream on-demand (VOD) uses a translation tier to manage the creation and/or handling of the IF components, i.e., the stream manifest, the fragment indexes (FI), and the IF fragments. The translation tier is used in lieu of the recording tier (in the live delivery network). In one VOD embodiment, the translation tier is implemented using an HTTP proxy and a translation process. The approach enables VOD streaming from customer and CDN-based storage origins, provides single and multiple bitrate (SBR and MBR) streaming, provides support for origin content stored in multiple different types of file format containers (supported mp4/flv codes include, among others, AAC, MP3, PCM for audio, and H.264 for video), and minimizes download of content beyond what is directly requested by the end user.

According to another aspect of this disclosure, Intermediate Format (IF) generation and handling may occur entirely within an HTTP proxy. In this approach, IF can be extended throughout the entire downstream HTTP delivery chain including, optionally, to the client itself (if the client also has an HTTP proxy interface).

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 13 depicts a fragment index and illustrates how an edge server process finds a key frame around a desired "seek" time.

DETAILED DESCRIPTION

Figure 1:
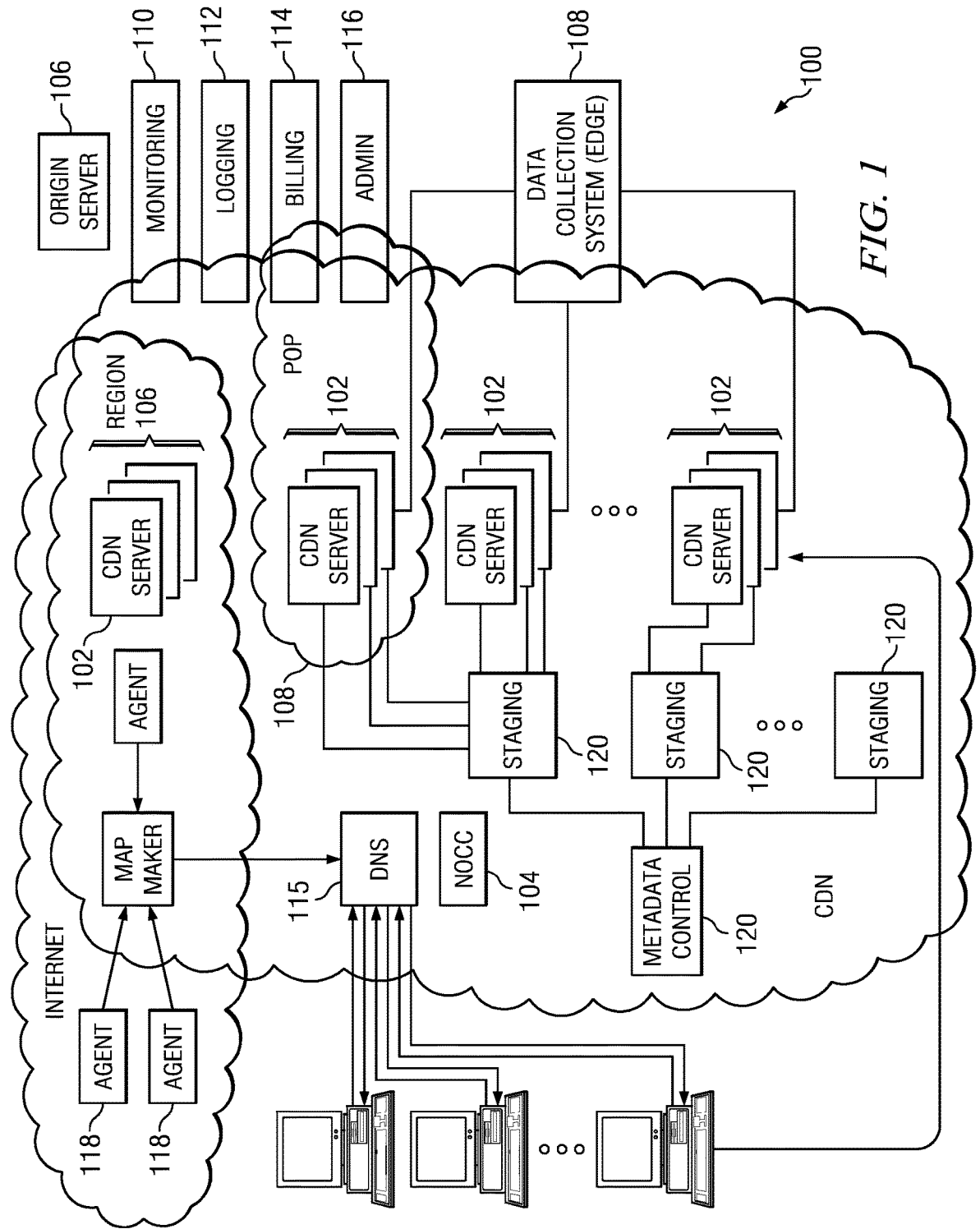
FIG. 1 is a block diagram illustrating a known distributed computer system configured as a content delivery network (CDN)

FIG. 1 illustrates a known distributed computer system that (as described below) is extended by the techniques herein to provide a single HTTP-based platform with the ability to deliver online HD video at broadcast audience scale to the most popular runtime environments and to the latest devices in both fixed line and mobile environments.

In this representative embodiment, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 may be used to administer and manage operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire such content may be directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
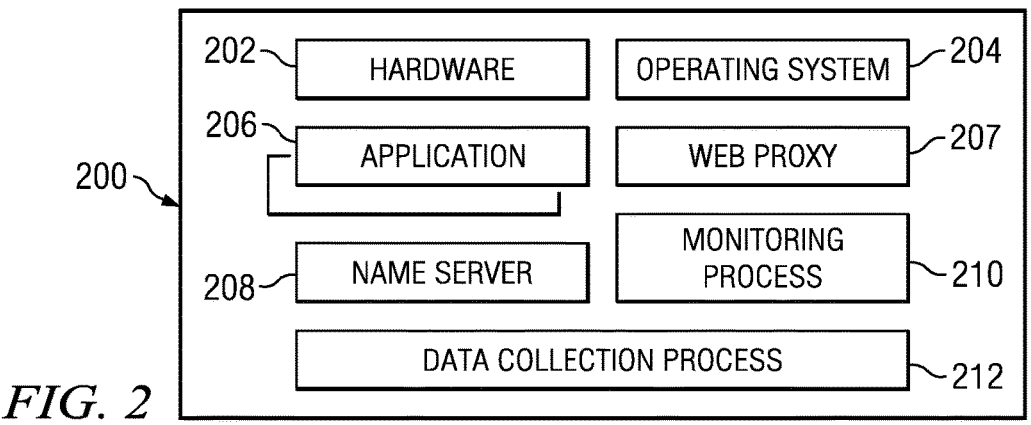
FIG. 2 is a representative CDN edge machine configuration.

As illustrated in FIG. 2, a given machine 200 in the CDN (sometimes referring to herein as an "edge machine") comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (also referred to herein as an "edge server process"), a name server 208, a local monitoring process 210, a distributed data collection process 212, and the like. The HTTP proxy 207 typically comprises a cache, and a manager process for managing the cache and delivery of content from the edge machine. For streaming media, the machine typically includes one or more media servers, such as a Windows Media Server (WMS) or Flash 2.0 server, as required by the supported media formats. When configured as a CDN "edge" machine (or "edge server"), the machine shown in FIG. 2 may be configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information and this and other edge server control information (sometimes referred to as "metadata") can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

For live streaming delivery, the CDN may include a live delivery subsystem, such as described in U.S. Pat. No. 7,296,082, the disclosure of which is incorporated herein by reference.

As will be described, this disclosure describes how the above-identified technologies can be extended to provide an integrated HTTP-based delivery platform that provides for the delivery online of HD-video quality content to the most popular runtime environments and to the latest devices in both fixed line and mobile environments. The platform supports delivery of both "live" and "on-demand" content.

Live Streaming Delivery

As used herein, the following terms shall have the following representative meanings. For convenience of illustration only, the description that follows (with respect to live streaming delivery) is in the context of the Adobe Flash runtime environment, but this is not a limitation, as a similar type of solution may also be implemented for other runtime environments both fixed line and mobile (including, without limitation, Microsoft Silverlight, Apple iPhone, and others).

An Encoder is a customer-owned or managed machine which takes some raw live video feed in some format (streaming, satellite, etc.) and delivers the data to an Entry Point encoded for streaming delivery. An Entry Point (EP) typically is a process running on a CDN streaming machine which receives video data from the customer's Encoder and makes this data available to consumers of the live stream.

For Adobe Flash, this is a Flash Media Server (FMS) configured to accept connections from Encoders. A Flash Media Server is a server process for Flash media available from Adobe Corporation. In this embodiment, an Intermediate Region (IR) typically is a Flash Media Server which the CDN has configured to act analogously to a streaming set reflector, such as described in U.S. Pat. Nos. 7,296,082 and 6,751,673. These machines relay streams from FMS EPs to FMS Edge regions, providing fan out and path diversity. A "Region" typically implies a set of machines (and their associated server processes) that are co-located and are interconnected to one another for load sharing, typically over a back-end local area network. A Flash Edge machine is a Flash Media Server which has been configured to accept client requests. This is the software running on the Flash EP, IR, and Edge machines in a representative embodiment. Intermediate Format (IF) is an internal (to the CDN) format for sending streaming data from EP to an edge server HTTP proxy. As will be described in more detail below, IF preferably comprises several different pieces, including "Stream Manifest," "Fragment Indexes," and "IF Fragments." Live, DVR and VOD are defined as follows: "Live" refers to media served in real time as an event occurs; "DVR" refers to serving content acquired from a "live" feed but served at a later time; "VOD" refers to media served from a single, complete (i.e., not incrementally changing) file or set of files. Real Time Messaging Protocol (RTMP) is the streaming and RPC protocol used by Flash. Real Time Messaging Protocol Encrypted (RTMPE) is the encrypted version of RTMP using secrets built into the server and client. "SWF" or "Small Web Format" is the format for Flash client applications. SWF verification refers to a technique by which the Flash Player can authenticate to FMS that it is playing an unmodified SWF by sending hashes of the SWF itself along with secrets embedded in the client and server.

Figure 4:
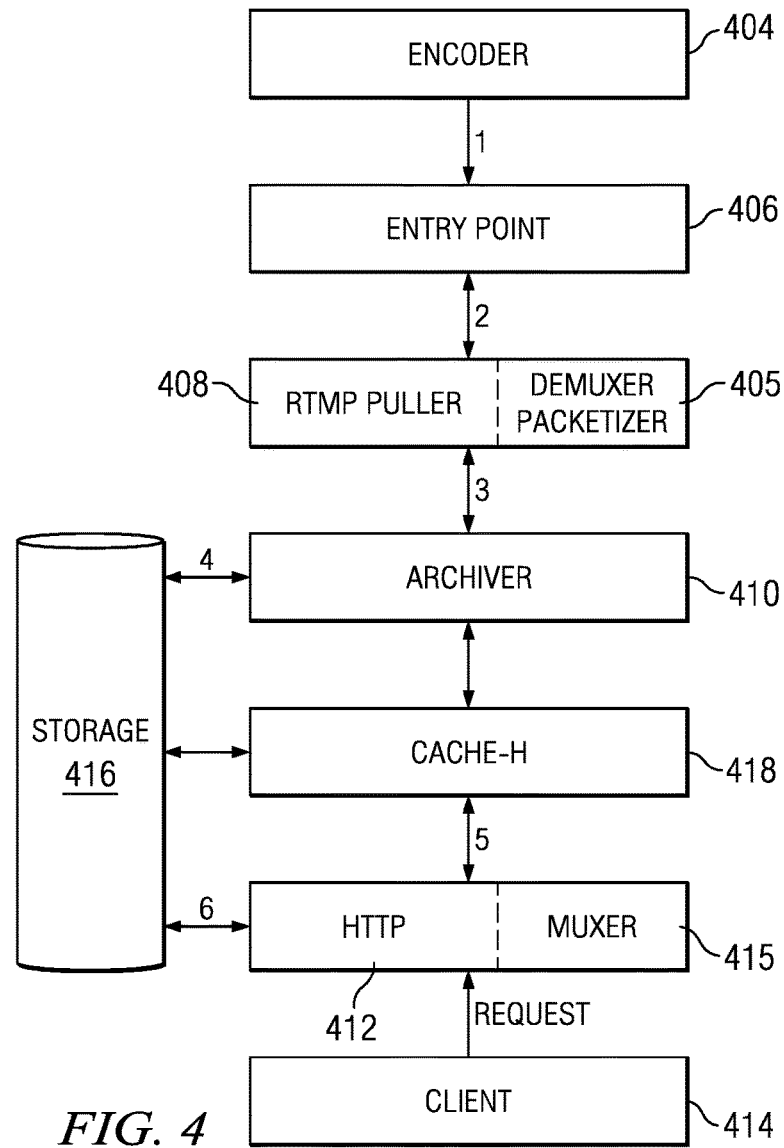
FIG. 4 shows the network of FIG. 3 in additional detail.
Figure 3:
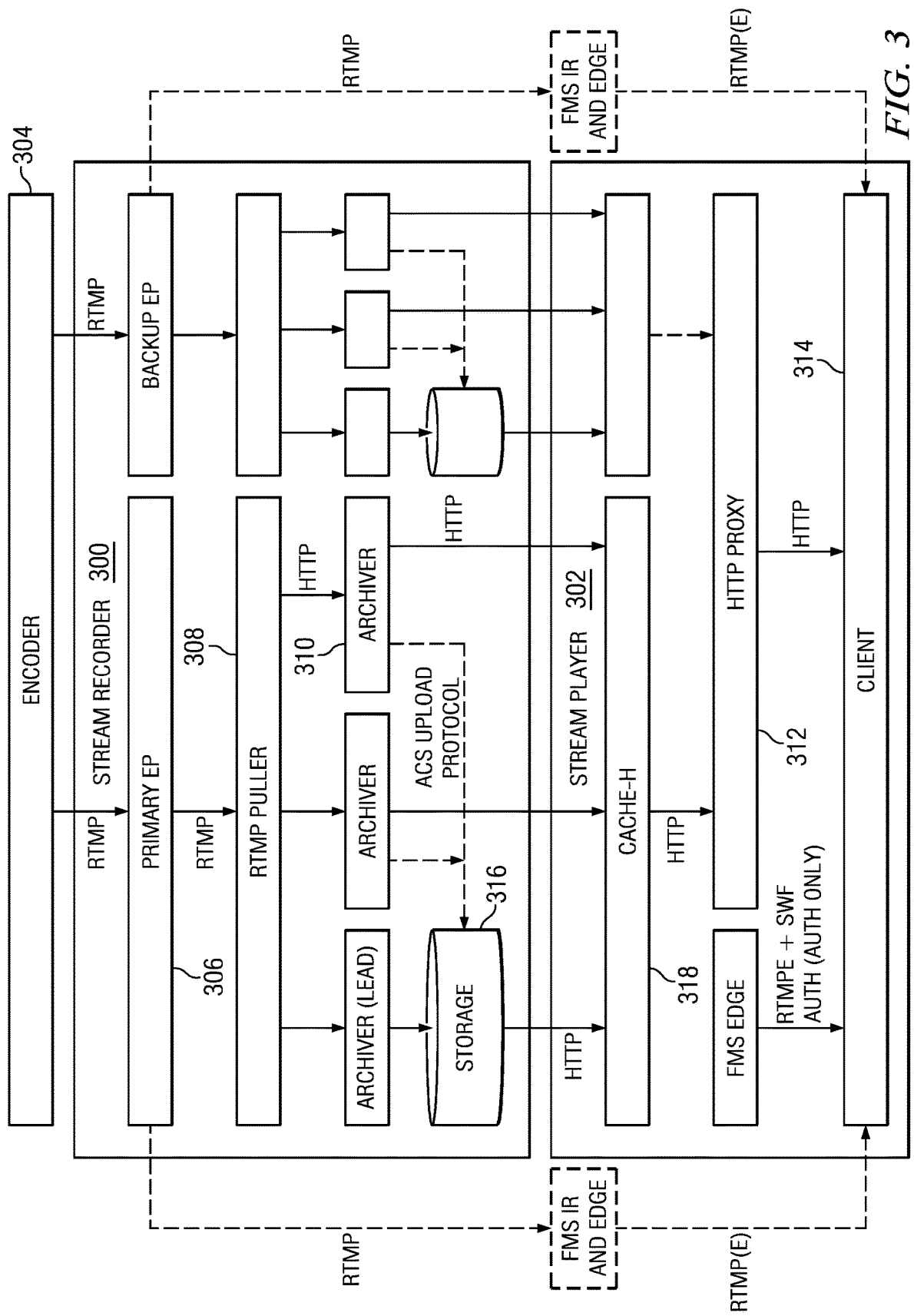
FIG. 3 illustrates a network for HTTP-based delivery of high definition (HD) "live" video to clients across both fixed line and mobile environments according to the teachings of this disclosure.

FIG. 3 illustrates an overview of a preferred architecture for live streaming delivery. A simplified version of this architecture is shown in FIG. 4. As can be seen in FIG. 3, the system generally is divided into two independent tiers: a stream recording tier 300, and a stream player tier 302. As will be described, the recording process (provided by the stream recording tier 300) is initiated from the Encoder 304 forward. Preferably, streams are recorded even if there are currently no viewers (because there may be DVR requests later). The playback process (provided by the stream player tier 302) plays a given stream starting at a given time. Thus, a "live stream," in effect, is equivalent to a "DVR stream" with a start time of "now."

Referring to FIG. 3, the live streaming process begins with a stream delivered from an Encoder 304 to an Entry Point 306. An RTMP Puller component 308 (e.g., running on a Linux-based machine) in an EP Region (not shown) is instructed to subscribe to the stream on the EP 306 and to push the resulting data to one or more Archiver 310 processes, preferably running on other machines. As illustrated, one of the Archivers 310 may operate as the "leader" as a result of executing a leader election protocol across the archiving processes. Preferably, the Archivers 310 act as origin servers for the edge server HTTP proxy processes (one of which is shown at 312) for live or near-live requests. The edge server HTTP proxy 312 provides HTTP delivery to requesting end user clients, one of which is the Client 314. A "Client" is a device that includes appropriate hardware and software to connect to the Internet, that speaks at least HTTP, and that includes a content rendering engine. The Client device type will vary depending on whether the device connects to the Internet over a fixed line environment or a mobile environment. A representative client is a computer that includes a browser, typically with native or plug-in support for media players, codecs, and the like. If DVR is enabled, content preferably is also uploaded to the Storage subsystem 316, so that the Storage subsystem serves as the origin for DVR requests as will be described.

As also seen in FIG. 3, the content provider may choose to deliver two copies of the stream, a primary copy, and a backup copy, to allow the stream to continue with minimal interruption in the event of network or other problems. Preferably, the primary and backup streams are treated as independent throughout the system up through the edge server HTTP proxy, which preferably has the capability of failing over from the primary to the backup when the primary is having difficulties, and vice versa.

A content request (from an end user Client 314) is directed to the CDN edge machine HTTP proxy 312, preferably using techniques such as described in U.S. Pat. Nos. 6,108,703, 7,240,100, 7,293,093 and others. When an HTTP proxy 312 receives an HTTP request for a given stream, the HTTP proxy 312 makes various requests, preferably driven by HTTP proxy metadata (as described in U.S. Pat. Nos. 7,240,100, 7,111,057 and others), possibly via a cache hierarchy 318 (see, e.g., U.S. Pat. No. 7,376,716 and others) to learn about and download a stream to serve to the Client 314. Preferably, the streaming-specific knowledge is handled by the edge machine HTTP proxy 312 directly connected to a Client 314. Any go-forward (cache miss) requests (issued from the HTTP proxy) preferably are standard HTTP requests. In one embodiment, the content is delivered to the Client 314 from the HTTP proxy 312 as a progressive-download FLV file. As noted above, the references herein to Adobe FLV are used herein by way of example, as the disclosed architecture is not limited for use with Adobe FLV. For secure streams, preferably the Client 314 first authenticates to the HTTP proxy 312 using an edge server authentication technique and/or a SWF-verification back-channel.

When a Client 314 requests a particular stream, the HTTP proxy 312 (to which the client has been directed, typically via DNS) starts the streaming process by retrieving a "Stream Manifest" that contains preferably only slowly changing attributes of the stream and information needed by the HTTP proxy to track down the actual stream content. The URL to download this manifest preferably is constructed deterministically from metadata delivered (e.g., via the distributed data transport mechanism of FIG. 1) to the HTTP proxy. Preferably, the manifest itself is stored in association with a Stream Manifest Manager system (not shown) and/or in the storage subsystem 316. Preferably, a Stream Manifest describes the various "tracks" that compose a stream, where preferably each track constitutes a different combination of bit rate and type, where type is "audio," "video," or "interleaved_AV." The Stream Manifest preferably includes a sequence of "indexInfo" time ranges for each track that describe forward URL templates, stream properties, and various other parameters necessary for the HTTP proxy to request content for that time range.

For "live" requests, the HTTP proxy starts requesting content relative to "now," which, in general, is approximately equal to the time on the edge machine HTTP proxy process. Given a seek time, the HTTP proxy downloads a "Fragment Index" whose name preferably is computed based on information in the indexInfo range and an epoch seek time. Preferably, a Fragment Index covers a given time period (e.g., every few minutes). By consulting the Fragment Index, an "Intermediate Format (IF) Fragment" number and an offset into that fragment are obtained. The HTTP proxy can then begin downloading the file (e.g., via the cache hierarchy 318, or from elsewhere within the CDN infrastructure), skipping data before the specified offset, and then begin serving (to the requesting Client) from there. Preferably, the IF fragments are sized for optimal caching by the HTTP proxy. In general, and unless the Stream Manifest indicates otherwise with a new indexInfo range, for live streaming the HTTP proxy then continues serving data from consecutively-numbered IF Fragments.

As used herein, and in the context of live HTTP-based delivery, the Intermediate Format (IF) describes an internal representation of a stream used to get data from the RTMP Puller through to the edge machine HTTP proxy. A "source" format (SF) is a format in which the Entry Point 306 provides content and a "target" format (TF) is a format in which edge machine HTTP proxy 312 delivers data to the Client 314. According to this disclosure, these formats need not be the same. Thus, SF may differ from TF, i.e., a stream may be acquired in FLV format and served in a dynamic or adaptive (variable bit rate) format. The format is the container used to convey the stream; typically, the actual raw audio and video chunks are considered opaque data, although transcoding between different codecs may be implemented as well. By passing the formats through the HTTP proxy (and delivering to the Client via conventional HTTP), the container used to deliver the content can be changed as long as the underlying codecs are managed appropriately.

Referring now to FIG. 4, the HTTP streaming architecture for live content may work as follows. At step 1, a content provider's encoder 404 pushes a live FLV stream to Entry Point (EP) 406. At step 2, the RTMP Puller 408 pulls the stream from the EP 406 and breaks it up into Intermediate Format (IF) file fragments and corresponding index information. A Demuxer process 405 facilitates this operation. The Puller 408 preferably uses metadata from a Stream Manifest file to determine how large to make each individual IF fragment. Preferably, and as noted above, IF fragment size is optimized for caching in the cache associated with an edge machine HTTP proxy.

At step 3, the Archiver 410 retrieves from the Puller 408 the IF fragments along with their corresponding index information. The Archiver 410 appends the index information for each IF fragment to the current Fragment Index (FI) file. Preferably, the Archiver 410 caches a predetermined number of IF fragments for live play-back. As the fragments age out, preferably they are deleted from the Archiver 410 and, at step 4, they are archived, e.g., to the Storage subsystem 416. Thus, at set intervals (e.g., every few minutes), the Archiver 410 closes the current FI file, archives it to the Storage subsystem 416, and begins creating a new FI file.

At step 5, and after an end user Client 414 has been associated with a particular edge machine, the HTTP proxy 412 in that machine gets the fragments for live play-back and limited DVR time periods from the Archiver 410 (possibly via the cache-hierarchy 418). Fragments no longer available on the Archiver 410 are retrieved from the Storage subsystem 416. A Muxer process 415 that operates in association with the HTTP proxy 412 facilitates this operation. Preferably, each IF fragment is a separate object for the HTTP proxy 412 that can be and is accessed through HTTP. In other words, according to this disclosure, the live stream is broken up into many small objects/fragments. The HTTP proxy 412 receives DVR commands from the Client player, typically on a separate HTTP connection. When the client player requests to begin playing from a new stream position, the HTTP proxy uses metadata from the Stream Manifest file to calculate which FI file contains the target time offset. The FI file is retrieved from the Archiver 410 or the storage sub-system 416 (or, alternatively, from a peer machine co-located with the edge machine) and contains the IF fragment and byte offset to begin streaming to the client player.

Figure 5:
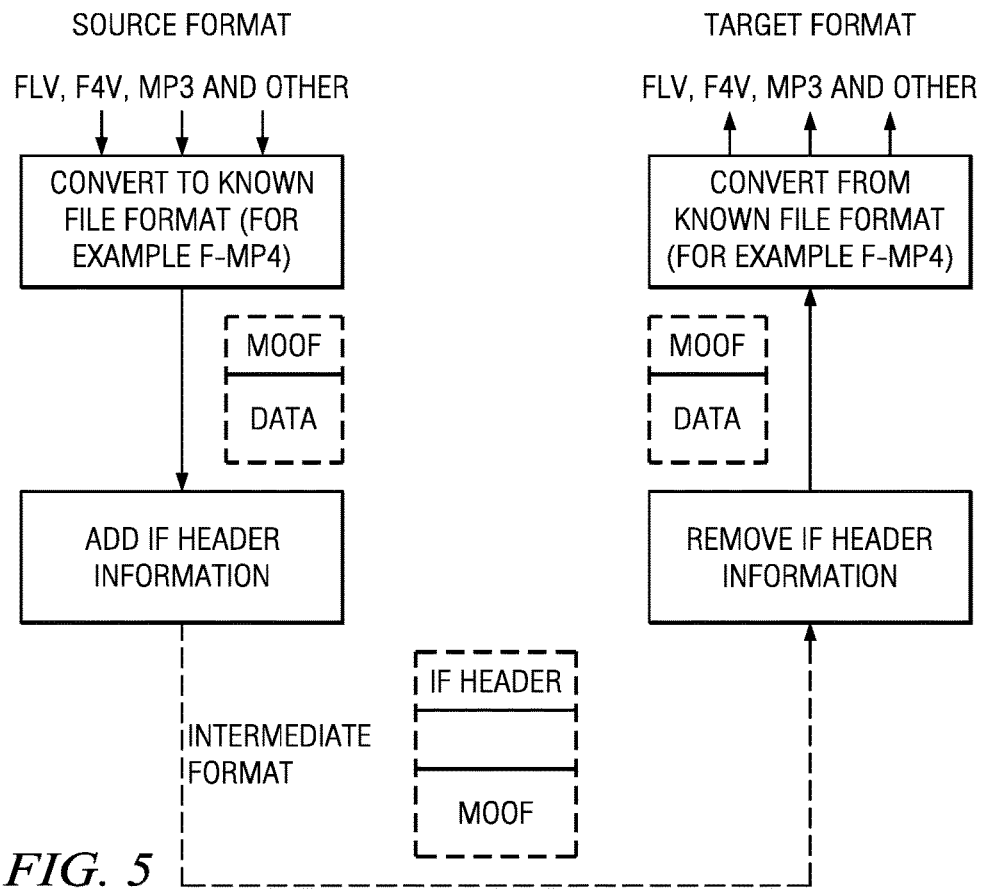
FIG. 5 illustrates a representative packet flow across the network of FIG. 3 from a source format (SF) to a target format (TF) using the Intermediate Fragments (IF) according to the disclosed technique.

FIG. 5 illustrates a representative packet flow from source format (SF) to target format (TF), although the conversion processes may be omitted (in other words, source format bits may be placed in the IF Fragment without additional format conversion). As noted above, preferably each video stream is broken into Fragments. Fragments are numbered consecutively starting at some arbitrary point (which can be determined by consulting the Fragment Index). The sequence may be discontinuous across Stream Manifest indexInfo ranges. Each Fragment preferably comprises header information describing the type of data enclosed. Following these headers are the IF payload, such as a sequence of FLV tags. A target format may also be just an encrypted form (such as based on AES128) of the elemental audio/video streams.

The Fragment Indexes enable the HTTP proxy process (to which a particular Client has been associated) to find a frame around a desired "seek time." Preferably, each Fragment Index file contains index information covering a fixed amount of time. The exact interval is stored in the Stream Manifest for each indexInfo range. The desired seek time (epoch time) can be rounded down to the nearest interval boundary to find the Fragment Index to request.

Preferably, each stream is represented completely by the Stream Manifest, the Fragment Index and the IF Fragments. In an illustrative embodiment, the Stream Manifest is an XML file that contains the following information: stream epoch time (this time may be the time when the stream started or may be the oldest archived portion of the stream still available); stream Properties (like bit rate, video size, codec information, etc.); information about fragment indexes and which URL pattern to use to request FI file; and URL pattern for the fragments. The Fragment Index (FI) typically comprises the following: information about which key frame to start streaming from for a given time slice; key frame-to-fragment number mapping, key frame-to-time mapping, key frame to byte-offset in that fragment mapping, and so forth. Each IF Fragment contains approximately N seconds of stream, preferably optimized for HTTP proxy caching and not necessarily fragmented on time boundaries. Each fragment is composed of a fragment header, fragment stream header and a payload, and each fragment is uniquely identified by the fragment number. Fragment numbers incrementally increase.

Typically, and with reference back to FIG. 4, the Archiver 410 has the fragments for the most recent N minutes of the stream, and the rest of the fragments are on the Storage subsystem 416. The Archiver creates a Stream Manifest XML file for each stream. It puts all the necessary information that an HTTP proxy can use to make fragment and fragment index requests. For the Archiver to construct a Stream Manifest, preferably RTMP Puller sends the stream properties downstream. Preferably, the IF Fragment is used to serve time-related data, i.e. actual video/audio bytes. Also, preferably the HTTP proxy (to which the Client has been associated) makes requests for IF Fragments only. Thus, it is desirable to isolate fragments from packets that have stream properties.

The Muxer subsystem 415 associated with (or within) the HTTP proxy determines how to request IF, converts IF to the output stream, and passes this data to the HTTP proxy for serving to the requesting client. In addition, preferably the HTTP proxy process supports a control channel by which the client can make any combination of various requests against an active stream including, without limitation, sessionToken, seek, and switch. The control channel facilitates flow control when working in some runtime environments, such as where the client lacks its own flow control facilities. In this situation, the control channel passes throttle commands that may be based on a percentage of an average bit rate (over the server-to-client connection) to help maintain full a target buffer on the client side of the connection. A sessionToken request is a request to provide additional authentication information, e.g., via SWF Authentication. A "seek" is a request to start sending data as of a different time in the stream (including "jump to live"). A "switch" is a request to start sending data from a different track from the same Stream Manifest. This might be a bit rate switch and/or an angle change.

Thus, the HTTP proxy receives DVR commands from the client player, preferably on a separate HTTP connection. When the client player requests that playback begin from a new stream position, the HTTP proxy uses metadata from the Stream Manifest file to calculate which FI file contains the target time offset. The FI file is retrieved (e.g., from the Archiver or the Storage subsystem, or from a peer machine) and contains the IF fragment and byte offset to begin streaming to the client player.

As described, the Stream Manifest preferably is an XML file and contains information about fragment indexes and how to construct the URL for an FI file, how to construct the URL for the "now" request, and how to construct the URL for the fragments. The HTTP proxy caches the manifest, which can be retrieved to the proxy either from an Archiver (which may be tried first), or the Storage subsystem. Client players connect to the HTTP proxy to play the live stream (i.e., connect to the stream's "now" time). In response, the HTTP proxy makes a forward request to the Archiver to fetch the "now" time on a live stream. Metadata in the Stream Manifest is used by the HTTP proxy to create the "now" URL.

As also described, a stream has a number of FI files. Each contains stream keyframe information for a given time slice. The Fragment Index allows time offsets to be mapped to fragment numbers and byte offsets. The Stream Manifest file defines the time slice for each FI file.

Each IF Fragment contains approximately N seconds of a stream. Each fragment is composed of a header and a payload. The HTTP proxy understands the data in the header, but the payload is opaque. The HTTP proxy links together with a Muxer component to convert the IF-formatted payload to the target format that is streamed to the client player. The fragments are cached in the HTTP proxy for re-use, and each fragment is identified with its stream name and an integer suffix that increases incrementally. As described above, Archiver has the fragments for the most recent N minutes of the stream, and the rest of the fragments are on the Storage subsystem.

For non-authenticated content, preferably the client player connects to an http://URL to play a stream. Query string parameters can be used to request a particular seek time if the default (live if the stream is live, or the beginning of the stream if it is not live) is not appropriate. For authenticated content, preferably the original http://URL additionally contains a shared authentication token query string parameter generated by the customer origin. This enables the HTTP proxy process to serve the stream for some configured amount of time (e.g. a given number of seconds). After that time, the HTTP proxy process terminates the connection unless, for example, an out-of-band control POST is received with a signed "session token." Although not meant to be limiting, in one approach this token preferably is generated by the client by connecting to an FMS (or equivalent) edge machine that can perform SWF Verification (as shown in FIG. 3). The machine returns the signed session token to the client to be forwarded back to the HTTP proxy process as a control channel POST. Once the session token is received by the HTTP proxy, the stream preferably will play indefinitely. Other types of stream authentication may be implemented as well.

Figure 6:
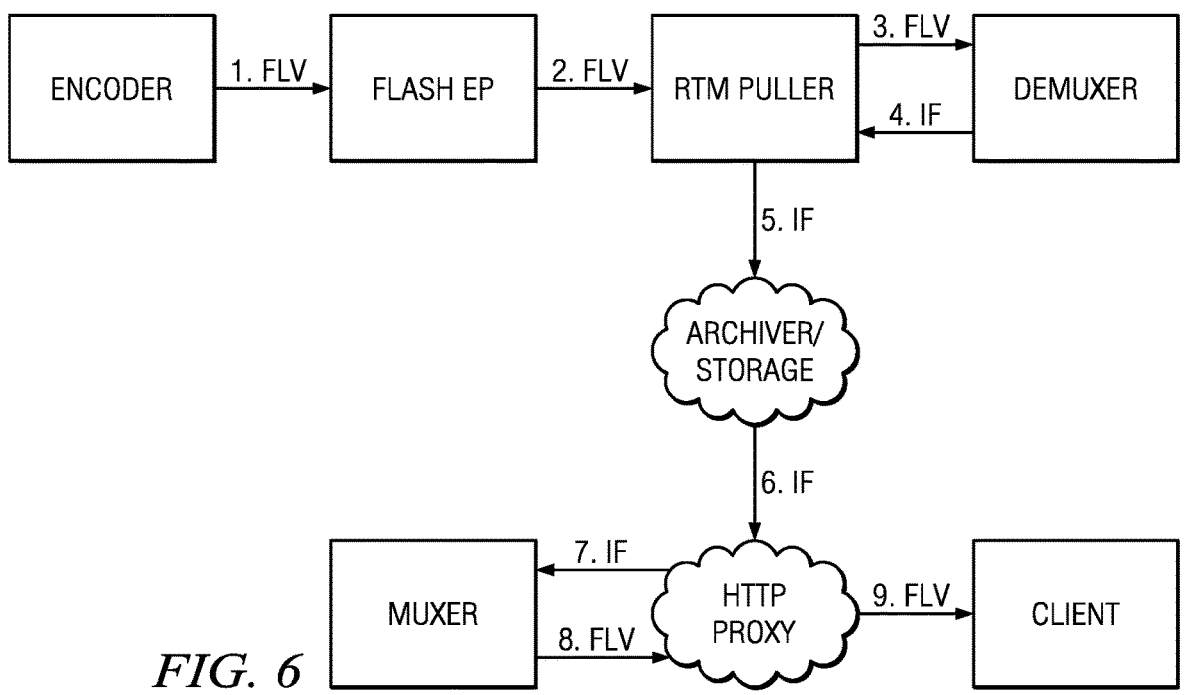
FIG. 6 illustrates another view of the flow of media packets into and out of the streaming server framework.

FIG. 6 is another view of the flow of the media packets into and out of the streaming server framework of this disclosure for live streaming. As noted above, the framework processes (demuxes) the incoming media packets into an intermediate format (IF). In particular, the Encoder pushes the CDN customer content into an Entry Point. The Puller then pulls the content from the EP and passes the data to its associated Demuxer, which converts the incoming source format (SF, such as FLV) to IF fragments before injecting them into the Archiver network. An Archiver receives data from the RTMP Puller and incrementally writes this data to memory, such as a RAM disk (or other data store). If the HTTP proxy (to which a Client has been associated) requests a Fragment or Fragment Index that is currently in the process of being received from the Puller, the Archiver sends the response (preferably in a chunk-encoded HTTP response) so that the data can be sent as soon as it is received. Once a Fragment or Fragment Index is complete, a designated leader Archiver (selected via a leader election process) attempts to upload the resulting file to the Storage subsystem. As noted above, the muxer component associated with the edge region/server processes (muxes) the packets to the desired target format (TF) before the packets reach the end clients.

A Demuxer process may be integral to the Puller; likewise, a Muxer process may be integral to the HTTP proxy process. There may be one Demuxer process for multiple Pullers; there may be one Muxer process for multiple HTTP proxies (within a particular Region).

As noted above, in terms of functionality, Demuxer converts regular stream packets into IF fragments and Muxer does the opposite. By definition, Demuxer and Muxer should complement each other. As noted, Demuxer can be part of an RTMP Puller process or can be a separate process running on the RTMP Puller machine. Demuxer receives input via the RTMP Puller. It is responsible to do the following: generate IF Fragment Header, take the source format and package the same into IF body, add Fragment Stream Header, Push IF fragment to Archiver, analyze the fragment and generate index information pertinent to key frame location within a given FLV packet, Push Key frame information to the Archiver. This can be done synchronously/asynchronously with respect to the IF fragment transmission. Preferably, Demuxer also is responsible for determining an optimal size of the fragment, which fragment size should be optimal for HTTP proxy caching. Demuxer can base its decision (regarding the optimal size of the fragment) by examining the following stream properties: incoming live stream byte rate/bit rate; Key Frame Interval, or a combination of both. Apart from constructing IF Fragments, Demuxer is also responsible to push Stream Properties and key frame information to the Archiver. Archiver can then create the Stream Manifest file that will be used by the HTTP proxy/Muxer to make fragment index and individual fragment requests. As described above, Muxer complements Demuxer. As Demuxer is responsible for constructing IF Fragments, Muxer is responsible for deconstructing the IF Fragments and converting the IF Payload format to the target format (TF) that the Client requested. The Muxer may also provide the following information to the HTTP proxy: statistics information about HTTP delivered Streams; and client session playback Information, such as playback duration, etc., and Muxer health data.

The Demuxer and Muxer enable dynamic transmux output to other file formats. This enables the system to leverage a single set of content sources for different device capabilities, e.g., iPhone 3.0 streaming using MPEG-2 TS Segments, Microsoft Silverlight 3 (with H.264 playback), Shoutcast, and so forth.

As a variant to the above-described "pull" model that operates between an Encoder and an Archiver, it is also possible to use a "push-based" approach.

Video on Demand (VOD) Delivery

The above-described architecture is useful for live streaming, particularly over formats such as Flash. The following section describes adding video on demand (VOD) support to the platform. In particular, the solution described below provides VOD streaming from customer and Storage subsystem-based origins, provides single and multiple bitrate (SBR and MBR) streaming, provides support for origin content stored in flv and mp4/flv containers (supported mp4/flv codes include, among others, AAC, MP3, PCM for audio, and H.264 for video), and minimizes download of content beyond what is directly requested by the end user.

For VOD delivery, the stream recorder tier 300 (of FIG. 3) is replaced, preferably with a translation tier, as will be described. For VOD delivery using HTTP, the Fragment Indexes may be generated from the origin content on-the-fly (e.g., by scanning FLV or parsing MP4 MOOV atoms) and caching these indexes. Actual data retrievals may then be implemented as "partial object caching" (POC) retrievals directly from source material at the edge region or via an intermediate translation (e.g., by a cache-h parent) into an Intermediate Format. As used herein, partial object caching refers to the ability of an HTTP proxy to fetch a content object in fragments only as needed rather than downloading the entire content object. The HTTP proxy can cache these fragments for future use rather than having to release them after being served from the proxy. An origin server from which the content object fragments are retrieved in this manner must support the use of HTTP Range requests.

Before describing a VOD implementation in detail, the following section describes several ways in which VOD content is off-loaded for HTTP delivery to the CDN. In a first embodiment, a conversion tool (a script) is used to convert source content flv to IF, with the resulting IF files then uploaded to the Storage subsystem. In this approach, metadata is used to have an HTTP proxy go forward to the Storage subsystem to retrieve the stream manifest, which then references the Storage subsystem for the remaining content. In this approach, files in mp4/flv are first converted to flv (e.g., using ffmpeg copy mode) to change the container to fly. Another approach is to have a CDN customer upload raw media files to the Storage subsystem and to run a conversion tool there. Yet another alternative is to have the customer (or encoder) produce content in IF directly.

The translation tier approach is now described. In this approach, an on-demand dynamic IF generator machine takes requests for IF (manifests, indexes, and fragments) and satisfies these requests by dynamically retrieving flv or mp4/f4v input file ranges (either from the Storage subsystem or customer origin). From there, HTTP proxy treatment is essentially the same as the "conversion tool" options described above. The generator machine preferably runs its own HTTP proxy (the "translator HTTP proxy") to cache various inputs and outputs, together with a translator process (described below) that accepts requests (e.g., from a local-host connection to the translator HTTP proxy) and generates IF based on data retrieved from the HTTP proxy via an associated cache process. In an alternative, the translator process may comprise part of the translator HTTP proxy, in which case IF generation takes place within the proxy. Fragment generation may also be carried out in an edge machine HTTP proxy or even further downstream (into the Client itself), such as where a Client maintains a session connection with one or more peer clients.

Figures 7, 8:
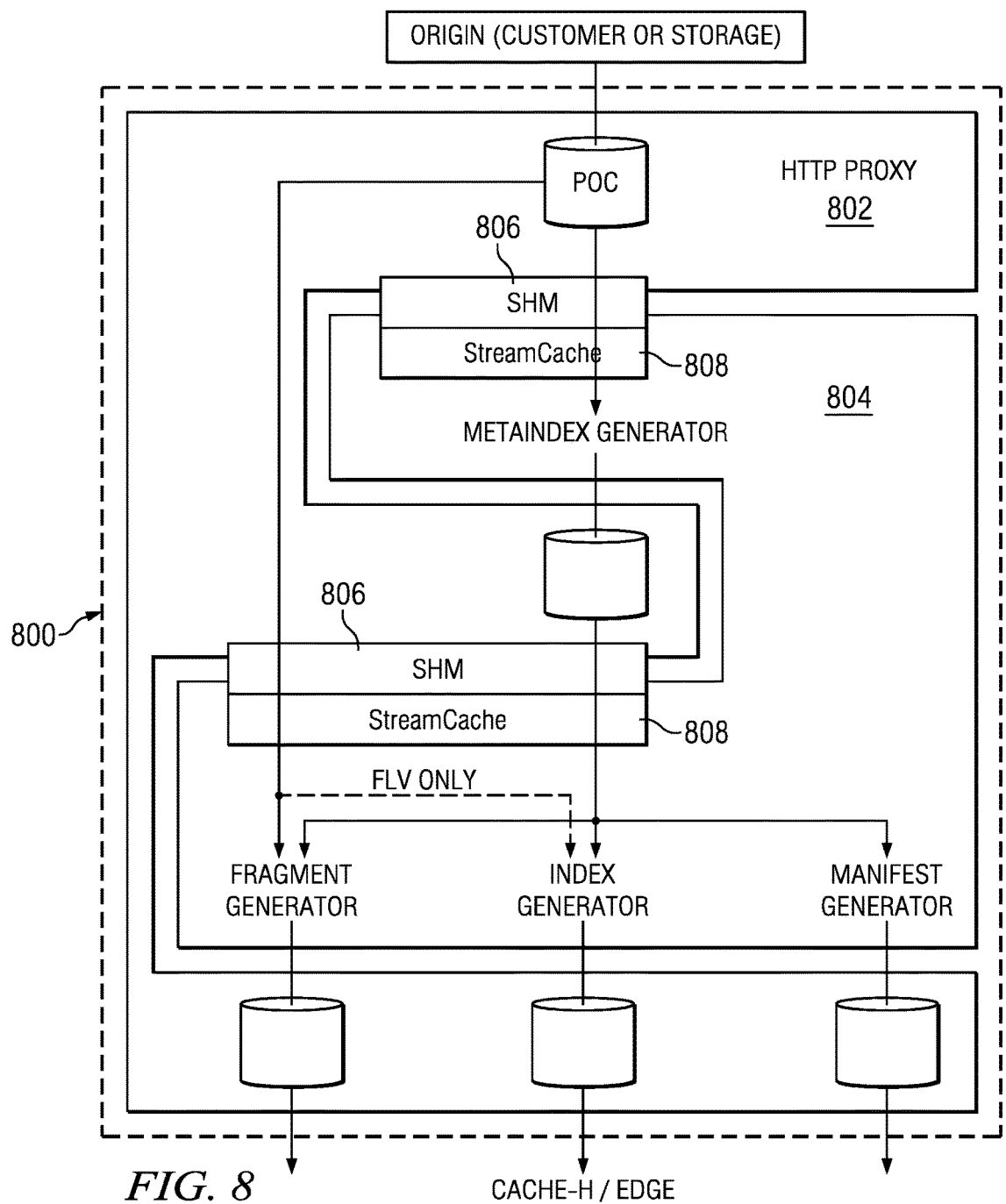
FIG. 7 illustrates how the network for HTTP-based delivery is used to provide video on demand (VOD) stream delivery.
FIG. 8 illustrates a representative translation machine configuration of the VOD portion of the HTTP-based delivery network.

An architecture and request flow of a preferred approach is shown in FIG. 7. In this embodiment, which is merely representative and non-limiting, a translation tier 700 is located between an origin 702 (e.g., customer origin, or the Storage subsystem, or both) and the stream player tier 704. In a representative embodiment, the translation tier executes in its own portion (e.g., a Microsoft IIS or equivalent network) within the CDN, preferably in a Region dedicated to this purpose. Alternatively, a translator (as described below) may run on a subset of HTTP-based edge machine Regions.

FIG. 8 illustrates a representative translator machine 800. This machine, like the machine shown in FIG. 2, includes CPU, memory, disk store and network interfaces to provide an Internet-accessible machine. In addition, as shown in FIG. 8, in this embodiment, the two main components of the translator machine comprise the HTTP proxy 802, and a translator process 804. The HTTP proxy 802 performs partial object caching (POC) and interacts with the translator process 804, which generates the stream manifest, index and fragments. The proxy and translator components interface to one another via shared memory 806 and a stream cache process 808, described in more detail below. The operation of the translation machine is best provided by way of an example. The following section describes the request flow from client to origin for a single bit rate (SBR) stream request, and how the components described above facilitate this process. Example URLs are provided.

As used below, "C" refers to the Client, "EG" refers to an edge machine HTTP proxy, "TG" refers to a translator machine HTTP proxy (such as proxy 802 in FIG. 8), "T" refers to the translator process (such as process 804 in FIG. 8), and "O" refers to origin (which may be a customer origin or the CDN Storage subsystem).

C→EG:

The process begins when a Client makes a request to the edge machine HTTP proxy for the desired content. A representative URL might be as follows:

URL: http://efvod.customer.com.akamaihd.net/foo/bar/baz.mp4

EG→itself:

The EG HTTP proxy then matches on the request pattern, and sets a number of parameters, such as "event," "angle," "bitrate," and "streamed." The actual pathname is the "event," and the "streamid" identifies a customer configuration associated with the request.

EG→TG:

The EG HTTP proxy then goes forward to retrieve the Stream Manifest from a translator machine; preferably, the HTTP proxy goes forward by providing a metadata-configured hostname (to the CDN DNS) that resolves to addresses associated with the translator machines. Preferably, the request path is prefixed with a customer identifier and protected by a per-customer secret, e.g., based on an authentication mechanism that operates between HTTP proxies. A representative URL might be as follows:

```
http://translator.customer.com.akamaihd.net/custid1/translate/foo/bar/baz.mp4?object=manifest
TG → T
```

If the translator HTTP proxy has already produced the Stream Manifest (or can find it, e.g., via ICP), the Manifest is returned to the edge HTTP proxy that requested it. Otherwise, the translator HTTP proxy itself goes forward to localhost to retrieve the manifest. Preferably, the customer identifier prefix is preserved. The translator HTTP proxy may also apply one or more host headers on the manifest request (to the translator process) that are then echoed back to the translator HTTP proxy in any requests for origin content, metaindexes, etc. Preferably, all TG↔T interactions carry these same headers. These headers ensure that the translator HTTP proxy is only fulfilling requests for the proper customer, and also to facilitate load balancing. The translator requests may also be authenticated using a cookie and a per-customer secret. A representative URL might be as follows:

```
http://translator.customer.com.akamaihd.net/custid1/translate/foo/bar/baz.mp4?object=manifest
Forward IP/port: 127.0.0.1:yyyy
T → TG:
```

The translator in turn retrieves the "metaindex" for the stream from the translator HTTP proxy using the stream cache process and the cookie. (To produce a manifest, typically only the beginning of the metaindex is retrieved.) The translator applies the customer-specific secret (from the original request) to the metaindex request back to the HTTP proxy. With the information in the "metaindex," the translator produces the Stream Manifest. A representative URL is as follows:

```
http://translator.customer.com.akamaihd.net/custid1/metaindex/foo/bar/baz.mp4&format=mp4
Forward IP/port: 127.0.0.1:80
TG → T:
```

If the translator HTTP proxy does not have the metaindex already cached, it again goes forward to the translator (same procedure as for the Manifest). A representative URL is as follows:

```
http://translator.customer.com.akamaihd.net/custid1/metaindex/foo/bar/baz.mp4&format=mp4
Forward IP/port: 127.0.0.1:yyyy
T → TG:
```

When the translator receives the request for the metaindex, it retrieves (via the stream cache process using same procedure as above for the Manifest) a small subset of the original content, which the translator HTTP proxy is able to retrieve from origin, preferably using partial object caching (POC). For flv files, preferably only the very beginning and the last block will be read. For mp4/f4v files, preferably the "moov" atom at the beginning of the file is processed in its entirety. A customer-specific prefix and secret preferably are passed along this entire path. A representative URL is as follows:

```
http://translator.customer.com.akamaihd.net/custid1/origin/foo/bar/baz.mp4
Forward IP/port: 127.0.0.1:80
TG → O:
```

The translator HTTP proxy ultimately goes forward to the appropriate origin on POC misses. A representative URL is as follows:

```
URL: http://some.origin.com/some/customer/prefix/foo/bar/baz.mp4
EG → TG → ... → O:
```

At this point, the edge machine HTTP proxy has a manifest and needs an index. The edge machine HTTP proxy again goes forward to the translator for the index. The process proceeds in essentially the same way as for the Manifest. For "mp4/f4v" files, preferably all indexes are pre-computed and stored verbatim in the metaindex so that no mp4/f4v content access is required. This is not a requirement, however. For "fly" files, producing full index information typically requires reading the entire file; thus, for this type of content, preferably small indexes (e.g., each a few seconds) are generated, e.g., using a binary search over the flv content and then downloading only that window of content. The forward request from the HTTP proxy (as specified in the Stream Manifest) may be as follows:

```
http://translator.customer.com.akamaihd.net/custid1/translate/foo/bar/baz.mp4?object=index&number=1234&etag=3-1234567890ab
```

Additional query-string parameters may be passed from the manifest back to the index or fragment requests to ensure consistency between any parameters that might have changed between manifest generation and index/fragment retrieval.
EG→TG→ . . . →O:

The final type of request is for the actual fragment. For mp4/f4v files, the metaindex includes instructions sufficient to produce any requested IF fragment without reparsing or otherwise consulting the original "moov" atom. Preferably, the actual raw data is retrieved via POC and/or the stream cache process and assembled into valid IF fragments. For flv files, the fragment is generated by seeking directly to "desired_fragment_size*(fragment_number−1)" and then scanning forward for the first valid flv tag. The end of the fragment is just the first tag boundary at or after file offset "desired_fragment_size*(fragment_number)". A representative URL is as follows:

```
http://translator.customer.com.akamaihd.net/custid1/translate/foo/bar/baz.mp4?object=fragment&number=1234&etag=3-1234567890ab
```

This completes the description of the client to origin request flow for an SBR stream request. The following provides additional details regarding the VOD implementation.

The metaindex is a binary format preferably comprising several sections, preferably in the following order: (i) fixed-size global header with per-stream information; (ii) additional "content-verifier" information, e.g., ETags, used to identify which file has been indexed; (iii) an "onMetaData" tag for the stream; (iv) per-track information, including flv codec identifier and optional codec configuration parameters required by AAC and H.264; (v) (mp4/f4v only) Lookup table to map fragment numbers to "sample_info" below; (vi) (mp4/f4v only) IF Indexes; (vii) (mp4/f4v only) "sample_info" which describes each individual sample to be interleaved into the output. The "sample_info" essentially is an optimized version of the "moov" atom that abstracts out many of the complexities of the mpeg-4 container. In general, this should be a fairly compact representation, often smaller than the corresponding "moov" atom.

A Stream Manifest may include all bitrates of a multi-bit rate (MBR) stream. To produce an MBR Stream Manifest, the manifest request may reference an SMIL file, which in turn contains the individual bitrates and flv or mp4/f4v source files. For MBR delivery, to produce the actual manifest the translator downloads metaindexes for each bitrate. The index and fragment requests only require the metaindex file for the particular bitrate(s) that the edge machine HTTP proxy wants to play. MBR fragment and index requests are similar to their SBR counterparts, except they also include an "smil= . . . " query-string argument added to each path in the C→EG→TG→T chain via patterns in a <locationInfo> tag in the manifest.

Preferably, the actual format ("mp4" vs. "fly") is included in metaindex, fragment, and index URLs as a "format" query string argument.

As noted above, IF generation can take place within or in association with the HTTP proxy, including even an edge machine. This enables the creation of content at the edge itself, close to the requesting end user. Indeed, this approach (of IF generation in or in association with the HTTP proxy) can move even further downstream, namely, into the client machine itself. This is possible if the client includes software that facilitates peer-based network session connectivity to a peer-to-peer (P2P) network, at least some portion of which is based on CDN resources including edge machines running HTTP proxies. As noted above, it is possible the IF is generated in an HTTP proxy (or in a Muxer process associated therewith). When such P2P network session software executes within a Client, it is possible to extend the HTTP proxy interface all the way downstream to the Client machine itself. In this approach, muxing takes place in the Client itself, in which case the edge machine becomes just a "parent" cache in a cache-hierarchy that includes the client-side delivery mechanism. This approach could also be used with mobile devices with limited bandwidth.

Component Descriptions

Figure 9:
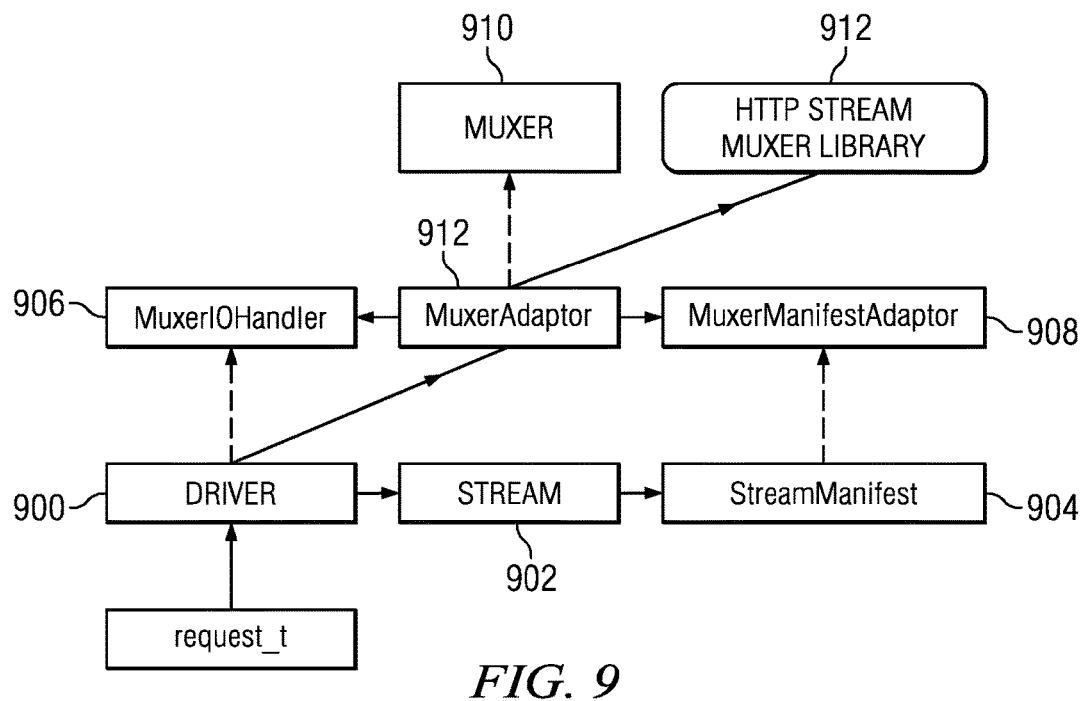
FIG. 9 illustrates a set of C++ classes executing in an edge machine that facilitate a muxer functionality.

FIG. 9 is a C++ class diagram describing how an HTTP proxy (referred to as "Ghost") process and the Muxer module interact during a client session. Within the edge server process (also called "ghost"), there are a set of classes, namely, a Driver class 900, a Stream class 902, and a StreamManifest class 904. A set of interfaces includes a MuxerIOHandler class 906, a MuxerManifestAdaptor class 908, and a Muxer class 910. A MuxerAdaptor Class 912 provides a streaming implementation within the edge server process, with support from a streaming library, called Http Stream Muxer 912. The Muxer implementation comprises the following modules: Muxer Adaptor Class 912, which inherits from Muxer class 910 defined by the edge server process. MuxerAdaptor Class 912 acts as a wrapper/adaptor to make calls to the Http Stream Muxer Library 912. Http Stream Muxer Library links to the edge server process. Preferably, the Muxer Adaptor Class is the only class that has access to this library's APIs. This library is mainly used to perform all Muxer-related operation i.e. converting from IF Payload to Target format.

Figure 10A:
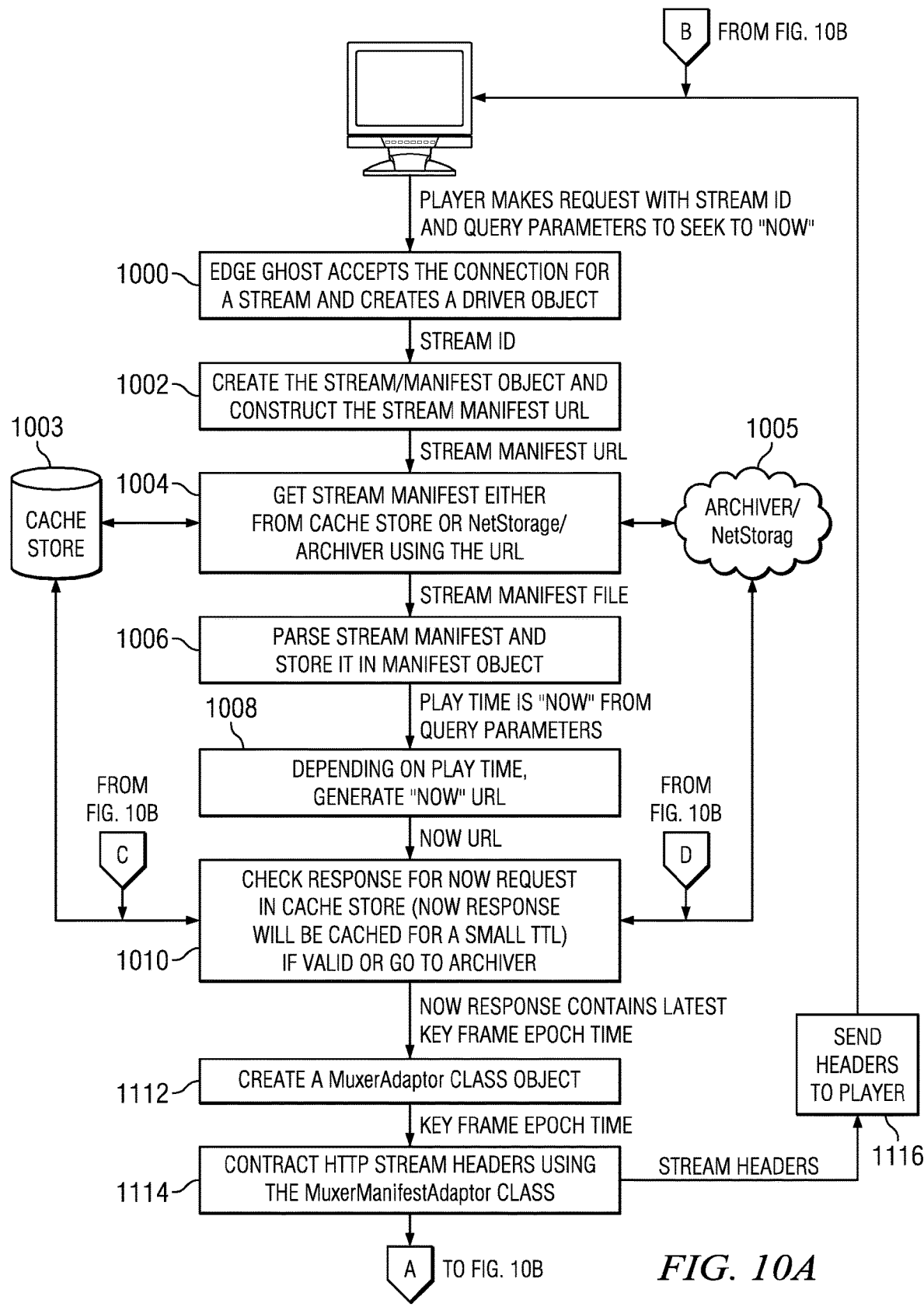
FIG. 10A-10B illustrates an interaction between a client player and an edge ghost process.
Figure 10B:
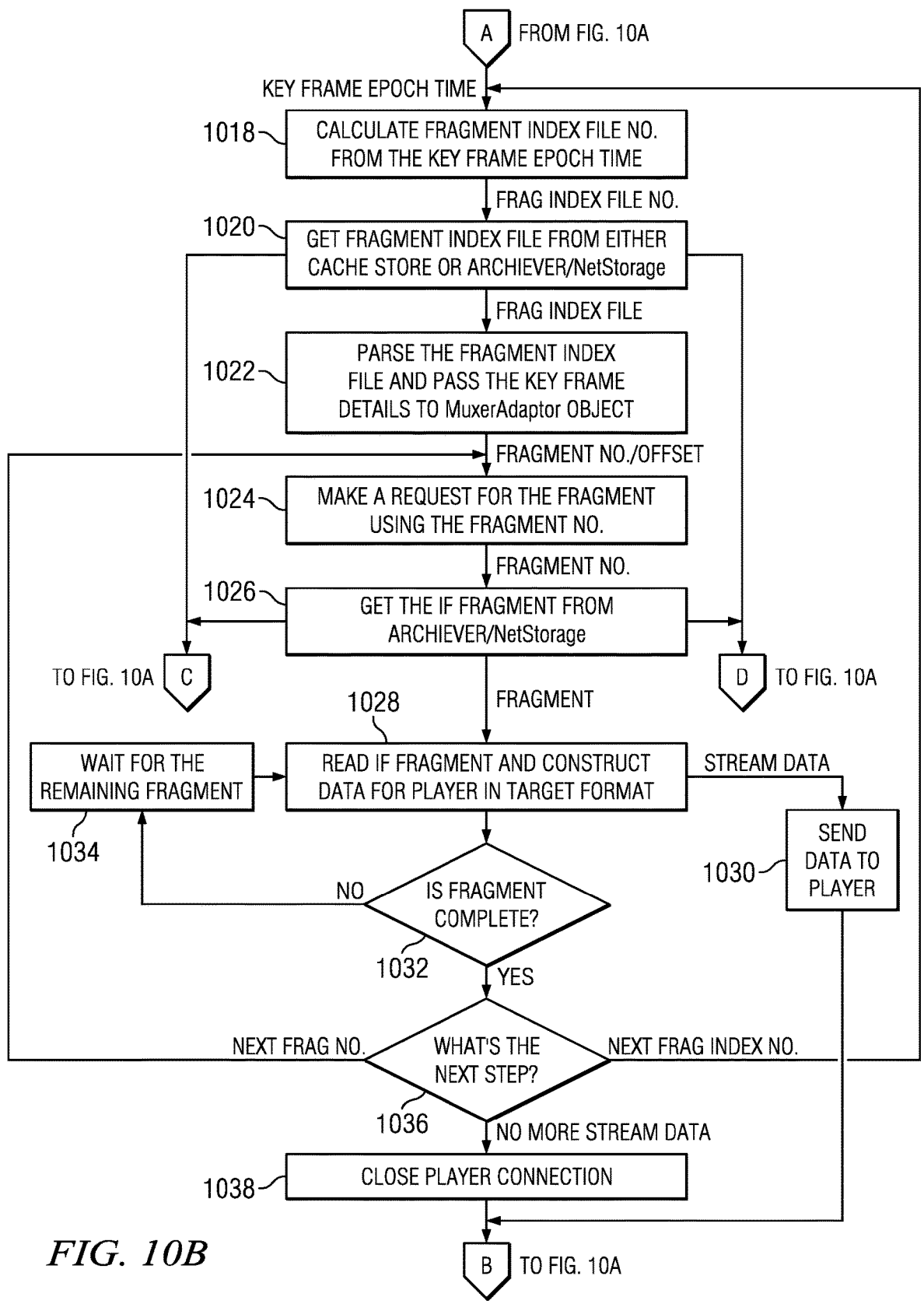

The process flows in FIGS. 10A and 10B illustrates a typical work flow of an Http Stream Request to play live content. Preferably, in this embodiment every new request to the HTTP edge server process (referred to in the drawing as an "Edge Ghost") for Http stream is considered as a progressive download stream. The workflow in FIGS. 10A and 10B highlights the interaction between the edge server process and MuxerAdaptor/Http Stream Muxer library. In particular, and as will be described, typically steps 1000, 1002, 1004, 1006, 1008, 1010, 1012, 1016, 1020, 1022, 1026, 1030 and 1038 are performed by one or more of the process classes shown in FIG. 9. Typically, steps 1014, 1018, 1024, 1028, 1032, 1034 and 1036 are performed by the MuxerAdaptor Class. MuxerAdaptor will call the necessary Http Stream Muxer library APIs to perform certain steps.

By way of background, and to facilitate what is represented in the drawing, a set of connectors is shown, namely, a Player Connector (P), a Cache Store Connector (C), an Archiver/Storage Connector (N), and a Workflow Connector (W). Generally, a client player connects to an edge server process (via the CDN DNS, or otherwise) to play live streams (i.e., connect to the stream's "now" time). The edge server process makes a forward request to an Archiver to fetch the "now" time on a live stream. Metadata in the Manifest File is used by the edge server process to create a "now" URL.

The Player Connector represents an end user Player making request with Stream ID and query parameters to seek to a "now" time. As noted above, a stream has a number of FI files, and each contains stream key frame information for a given time slice. The fragment index allows time offsets to be mapped to fragment numbers and byte offsets. The Stream Manifest file defines the time slice for each FI file. An input associated to the FI is the "now" request, and an output is the last received keyframe information for the "now" request. At step 1000, the edge server process accepts the connection for a stream and creates a driver object. Using the Stream ID, the edge ghost process then creates a Stream/Manifest object and constructs a Stream Manifest URL. This is step 1002. Using the Stream Manifest URL, the edge server process obtains the Stream Manifest either its local cache (Cache Store 1003) or from an Archiver or Storage (illustrated as 1005). This is step 1004. The edge server process then continues at step 1006 (using the Stream Manifest File) to parse the Stream Manifest and to store it in a Manifest object. Using the play time as "now" as identified in the query parameters, the edge server process generates a "now" URL at step 1008. Using this "now" URL, at step 1010 the edge server process creates the Now response, using local cache or by going forward to the Archiver or Storage as necessary. The Now response, which contains a latest keyframe epoch time, is then used by the edge server process at step 1012 to create a MuxerAdaptor Class object. The keyframe epoch time is then passed. The MuxerAdaptor Class object so created constructs Http stream headers using the MuxerManifestAdaptor class. This is step 1014. These stream headers are then returned to the edge server process, which then sends those headers back to the player in step 1016. The keyframe epoch time is then used by the MuxerAdaptorClass object to calculate a Fragment Index File number. This is step 1018, shown in FIG. 10B. Using the Fragment Index File number, control returns back to the edge server process, which, at step 1020, gets the Fragment Index file from either local cache or Archiver/Storage. Using the Fragment Index file, the edge server process continues at step 1022 to parse the file and pass the keyframe details to the MuxerAdaptorClass object. At step 1024, the MuxerAdaptorClass object using fragment number/offset passed from the edge server process to make a request for the fragment. This request is made to the edge server process, using the fragment number. Thus, at step 1026, the edge server process gets the IF fragment from the Archiver/Storage, as the case may be. The fragment is then passed back to the MuxerAdaptorClass object, which, at step 1028, reads the IF fragment and constructs data for the player in the target format. The stream data is then passed back to the edge server process, which, at step 1030, returns it to the player.

At step 1032, the MuxerAdaptorClass object tests whether the fragment is complete. If not, control continues at step 1034, while the object waits for the remaining portion. If, however, the outcome of the test at step 1032 indicates the fragment is complete, the MuxerAdaptorClass continues its processing at step 1036, either by returning to step 1024 (for the next Fragment) or by returning to step 1018 (for the next Fragment index). If there is no more stream data, control returns to the edge server process, which, at step 1038, closes the Player connection to complete the process of responding to this particular request.

In a seek mode, preferably the client player does not establish a new connection for the seek request. For Http-based streaming, preferably the client only initiates a new connection to the edge ghost process to post a seek control message. Preferably, the session id for this seek request is the same as that used when the connection is first established. When the edge ghost process receives the seek control message from the client player, preferably it uses the same objects that were created when the session first started. For seek requests, the edge ghost process may calls a dedicated Muxer process function. The MuxerAdaptorClass and Http Stream Muxer library handle the transition from the previous mode, e.g., live mode, to the new seek mode.

As noted above, a representative IF Fragment includes a fragment header, a fragment stream header, and a payload. The fragment header is a fixed size header, and each fragment has only one such header. It provides IP specification version, fragment number, fragment creation time, fragment stream type (audio/video/interleaved AV), the latest stream manifest file version, payload offset field to indicate the start of the payload data, header type and header length. The fragment stream header can be of variable size, and each fragment has only one such header. It provides information about the stream properties: stream name, stream source format and sub-type (e.g., FLV), IF payload format and sub-type (e.g., FLV, F-MP4, etc.) header type and header length.

As described, preferably each IF fragment contains approximately "n" seconds of stream. Preferably, IF files are sized for optimal edge ghost process caching and not necessarily fragmented on time boundaries. As noted above, each fragment is composed of a header and a payload. The edge ghost process understands the data in the header but typically the payload is opaque. As illustrated in the FIG. 10A-B, the edge ghost process links together with the muxer component to convert the IF-formatted payload to the target format, which is then streamed to the client player. Preferably, the edge ghost process also caches the fragments, preferably as regular StoreEntries. Each fragment is identified with its stream name and an integer suffix that increases incrementally. Archiver has the fragments for the most recent N minutes of the stream, and the rest of the fragments are on Storage. Preferably, any fragment for a particular stream type has an associated IF Fragment Number, which is a unique identifier. The fragment number increases incrementally. The edge ghost process requests for IF fragment using its fragment number. RTMP Puller is responsible to assign a unique number to each fragment.

As noted above, the content provider (or a third party) encoder pushes a live FLV stream to the entry point, e.g., over RTMP. The RTMP Core pulls the stream from the entry point and breaks it up into the file fragments. The RTMP Core contacts the Stream Manifest Manager and provides stream information. The Stream Manifest Manager supplies information regarding which Archiver is set to push IF Fragments. The RTMP Core creates the IF Fragments and pushes them to the Archiver. The IF Fragment size is optimized for edge server ghost process caching. The Archiver retrieves from the RTMP Core the IF Fragments along with stream keyframe information. It then appends the stream's keyframe information to a current Fragment Index (FI) file. The Archiver caches a predetermined number of IF Fragments and fragment indexes for live playback. As the fragments age out, they are deleted from the Archiver and archived to Storage. At set intervals (e.g., every few minutes), the Archiver closes the current FI file, archives it to Storage, and begins creating a new FI file. The edge ghost process gets the fragments for live playback and limited DVR time periods from the Archiver. Fragments no longer available on the Archiver are retrieved from Storage. Each IF fragment is a separate object for the edge ghost process that can be accessed through HTTP. Thus, the live stream is broken upon into many small objects/fragments. The edge ghost process receives DVR commands from the client player on a separate HTTP connection. When the client player requests that playback begin from a new stream position, the edge ghost process uses metadata from the Stream Manifest File to calculate which FI file contains the target time offset. The FI file is retrieved (from a peer, from an Archiver, from Storage, as the case may be) and contains the IF fragment and byte offset to begin streaming to the client player. Thus, requests are dynamically re-assembled by the edge ghost process from fragments on-the-fly.

As also noted above, the muxer and demuxer enable dynamic transmux output to other file formats. This enables the system to leverage a single set of content sources for different device capabilities (e.g., iPhone 3.0 streaming using MPEG-2 TS Segments, Microsoft Silverlight 3 (with H.264 playback), Shoutcast, and so forth.

The following provides additional details regarding the support provided in the edge server process.

Figure 11:
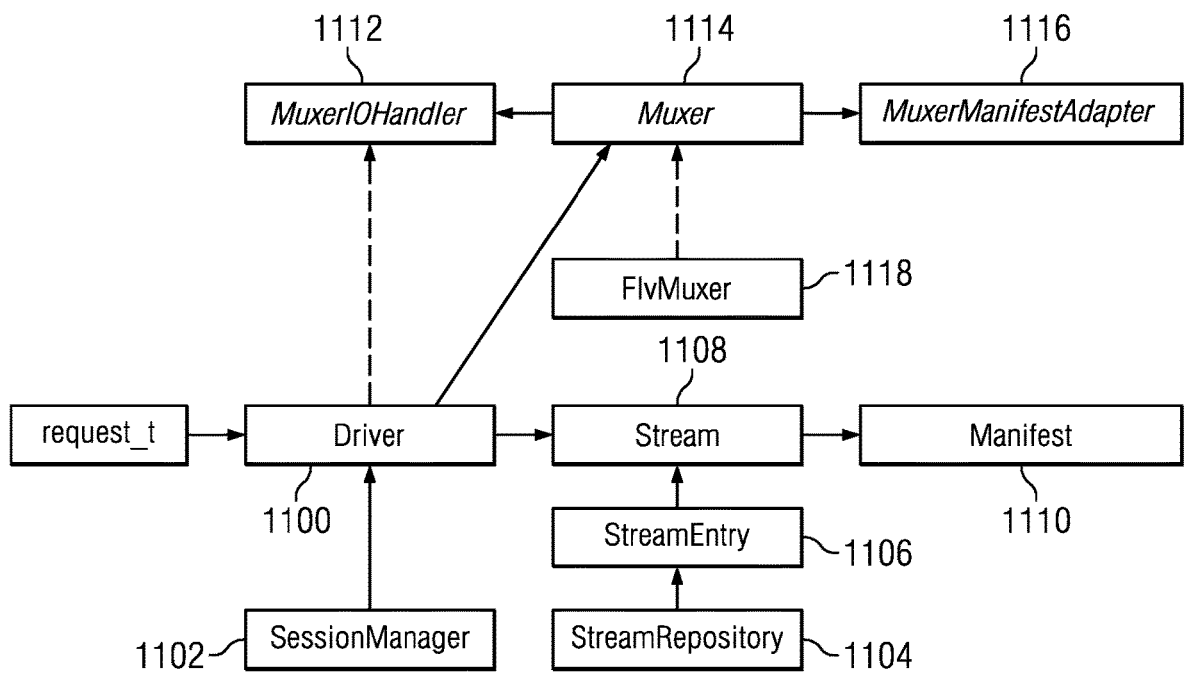
FIG. 11 is a more detailed illustration of a set of representative C++ classes that comprise an edge server process.

Preferably, the functionality described herein is implemented as a separate subsystem in the edge server process. FIG. 11 is a diagram that shows the relationship between the C++ classes in one embodiment. These classes are now described. As noted above, preferably there are a set of edge server process classes that are not exposed to the muxer implementations. They include a Driver 1100, SessionManager 1102, StreamRepository 1104, StreamEntry 1106, Stream 1108, Manifest 1110. The abstract classes for the muxer include MuxerIOHandler 1112, Muxer 1114, MuxerManifestAdapter 1116, and FlvMuxer 1118.

There is an instance of the Driver 1100 in request_t for each request that is configured for Http streaming. This is the overall driver. It looks up the Stream instance for a Stream ID from the StreamRepository 1104. If necessary, the Driver 110 fetches and parses the stream manifest for the stream. It also gets (from the Archiver) the "now" time for the stream and checks to be sure that the time requested by the client is permitted; if not, an error is returned. The Driver 1100 is also responsible for creating a Muxer 1114. Further, the Driver sends a startStream message to the Muxer. The Muxer responds by assembling the stream using the MuxerIOHandler interface 1112 from the Driver 1100. When the stream is finished, the Muxer informs the Driver 1000, which terminates the chunk-encoded response to the client.

The edge server process generates a unique session ID for each stream client. The SessionManager 1102 maps each session ID to its current Driver. In particular, the session ID is added to the generated stream by the Muxer 1114 using an "onMeta" FLV tag. The client can make "control" requests to the edge server process to change the current time of a stream (DVR functionality), or change the bitrate, or switch to a different rendition of the stream. SessionManager also is used for reporting purposes.

The StreamRepository 1104 is a hash table with a list of all the streams, keyed by StreamID, where StreamID is a metadata parameter. The value for each StreamID is a StreamEntry. StreamRepository can be used for reporting purposes to see all the streams currently served by the edge server process.

The StreamEntry 1106 is a set two streams: primary and backup. These streams show the same event but might come from two different entrypoints, which may not be synchronized. Each of these streams preferably has its own manifest. The StreamEntry knows which one is the "preferred" stream.

The Stream 1108 has a manifest, and a set of functions to asynchronously fetch the "now" time, indexes and fragments, and it keeps track of miscellaneous statistics (number of concurrent clients, etc.). The Manifest 1110 encapsulates the stream manifest. Another class (called Fetcher), not shown, is used to fetch a variety of objects, such as manifests, "now" time, IF indexes, and IF fragments.

The Muxer interfaces provide the FLV muxer implementation. MuxerIOHander 1112 is used by the Muxer to handle asynchronous I/O. The Muxer 1114 transforms an input (made of IF fragments) into a stream that a player can use. The MuxerManifestAdapter 1116 is a class that gives the Muxer access to the Manifest 1110. The muxer implementation is done by creating a streaming::FlvMuxer class which implements the streaming::Muxer interface.

As noted above, the Stream Manifest is an XML file that contains Stream epoch time (when the stream started or may be the oldest archived portion still available), information about fragment indexes and how to construct the URL for a FI file, how to construct the URL for the "now" request, and how to construct the URL for the fragments. The edge server process caches the manifest as a regular StoreEntry. It is assumed that the manifest URL is the same as the incoming URL without the query string. Preferably, there is a manifest file on the Archiver, and one on Storage. When the manifest is needed, the Archiver is tried first.

A stream has a number of FI files. A Fragment Index (FI) contains stream index information for a given time slice. The FI allows time offsets to be mapped to fragment numbers and byte offsets. The Stream Manifest file defines the time slice for each FI file. The input to the FI is "now" or a requested time offset. The output of the FI is a fragment number or byte offset. As described above, client players connect to the ghost edge server process to play live streams. (i.e., connect to stream "now" time). In response, the edge server process makes a forward request to the Archiver to fetch the "now" time on a live stream. Metadata in the manifest file is used by the process to create the "now" URL.

Each fragment contains approximately n seconds of stream. As noted above, preferably IF files are sized for optimal caching and not fragmented on time boundaries. Each fragment is composed of a header and a payload. The edge server process understands the data in the header but the payload is opaque. The edge server process links together with a muxer component to convert the IF formatted payload to the target format, which is then streamed to the client player. The edge server process caches the fragments as regular StoreEntries. Each fragment is identified with its stream URL and a query string parameter indicating the fragment number. Archiver has the fragments for the most recent N minutes of the stream, and the rest of the fragments are on Storage.

There may be several incoming source formats to an EP. Preferably, the incoming source formats get converted to the IF format at the RTMP Puller. The edge server process converts the IF format to the target format based on the user request.

The following is a high level summary of the processing within the edge server process for the HTTP streaming functionality. At a first step, the request arrives to the edge server process and metadata indicates http streaming is turned on. The edge server process then looks up the manifest in the StreamRepository. The key is the combination of the stream ID and the stream name. Both are coming from metadata. If the stream-manifest is not cached or is expired, the edge server process makes a forward request to retrieve it. The forward URL, host and port for the manifest are in metadata. The manifest tells the edge server process how to derive the "now". If the "now" is not present or expired, the edge server process makes a forward request to fetch it. The forward request is made under the host/url specified by the manifest. The edge server process then derives the fragment number and the byte offset from the fragment index in the manifest based on the "now" or the requested time offset. It then compares the requested time to "now". If the difference is larger than N, the edge server process fetches the fragment from Storage, otherwise from the Archiver. The URL for the fragment is specified in the manifest. If the fragment is not present or expired, the edge server process makes a forward request for it. The forward request is made under the host/url specified by the manifest. The edge server process then starts returning data from the given byte-offset.

As used herein, the following terms have the following meanings: pre-fetching means pre-fetching the next N fragments for seek/non-live playback; and, pipelining means anticipating and fetching the next fragment while the current, most recent live fragment is being played. Preferably, the muxer inside the edge server process determines when and what to prefetch and the edge server process executes the prefetching. The pipelining decision is implemented in the muxer. For live streams, typically edge server process starts streaming to an end-user N seconds behind "now". As long as it maintains this time difference, knowing the bit-rate of the stream and the approximate size of the fragments, the edge server process can make a decision on when to pipeline the next fragment. In the event the edge server process requests a live fragment from the Archiver that is not there yet, the Archiver will keep the connection open until the edge server process eventually times out and retries.

Preferably, each stream fragment is stored as a separate, independent object. In one embodiment, the objects are stored in the file system buffer cache, although this is not a limitation, as an edge server process hot object cache (HOC) may be utilized. Preferably, downloaded objects are maintained in memory only for a short time. Different fragment sizes may be used to optimize the performance from the file system buffer cache. Preferably, the edge server process treats each stream fragment as a separate object and therefore the fragments will need to be purged separately. To purge the entire stream, all fragments need to be purged.

Preferably, the internal representation of the stream, which is fragmented into IF files, is not exposed to the client player. From the player's perspective, the stream appears as though it was being streamed from a native streaming server e.g., FMS). In operation, the player makes requests to play the stream either "Live" or an absolute time relative to the start of the stream. The edge server process converts the requested time to a fragment number and byte offset within the fragment and begins streaming the content to the player. When the edge server process seeks to a new stream position, it sends an onMetadata event that contains the metadata of the stream, as supplied by the encoder, along with other metadata necessary to begin rendering the stream at the new playback position.

The following describes the player connect—start startup interaction. If the stream is configured via metadata to require authentication, then the player obtains an edge authentication (preferably) single-use token, e.g., from the customer's portal. This token will be referred to as the primaryToken. The player connects to the edge server process and, if authentication is required, sends the primaryToken in a query parameter. The edge server process closes the connection upon authentication failure. The edge server process begins streaming by first sending an onMetadata package which contains all of the metadata received from the encoder by the Entry Point (EP). Preferably, this metadata is stored in the stream's manifest file. Also, preferably included in the onMetaData package is the IP address of the edge server process and a session id which is used by the player to send another authentication token and/or DVR seek requests via the control channel described below. The edge server process then continues by sending the stream to the player from the requested start position. If authentication is required for the stream, then the player connects to a given server to perform authentication. If authentication fails, then the connection will be closed.

The following describes the DVR seek control channel. The control channel is used send seek requests to the edge server process when a new stream playback position is desired. Preferably, the player sends each stream control command to edge server process t via a POST request on a new connection. The control channel commands preferably are sent asynchronously to the edge server process, which continues to stream content to the player and the player continues to render the content during the time the player is communicating with the edge server process over the control channel. The Player uses a predefined URL to send stream control commands to the edge server process. Headers included with the POST include SEEK, the time in seconds from which the delivery stream should start playing (-1 means "live"), and SWITCH, the URL of the rendition to which the primary delivery session should switch to as soon as possible. (Other authentication and session-related headers may be included). Upon receiving a valid switch request, the edge server process cues up the new rendition and switches over at the next available keyframe boundary. The expectation on the player side is that the timestamp would increment normally over the transition. Every time a switch is made, the edge server process should send a onMetadata event at the start of the new rendition that carries the metadata of that stream, as supplied by the encoder, along with the standard edge server process IP and session id values. If SEEK and SWITCH commands are sent at the same time, it should be interpreted that the switch should be made to the new content and to the seek position specified. Because the control channel POST request is delivered to any edge server process, it is the responsibility of the process receiving the request to forward the request to the targeted edge server process (by extracting the edge server process IP address from the sessionToken or via the IP header if the sessionToken is not provided).

Figure 12:
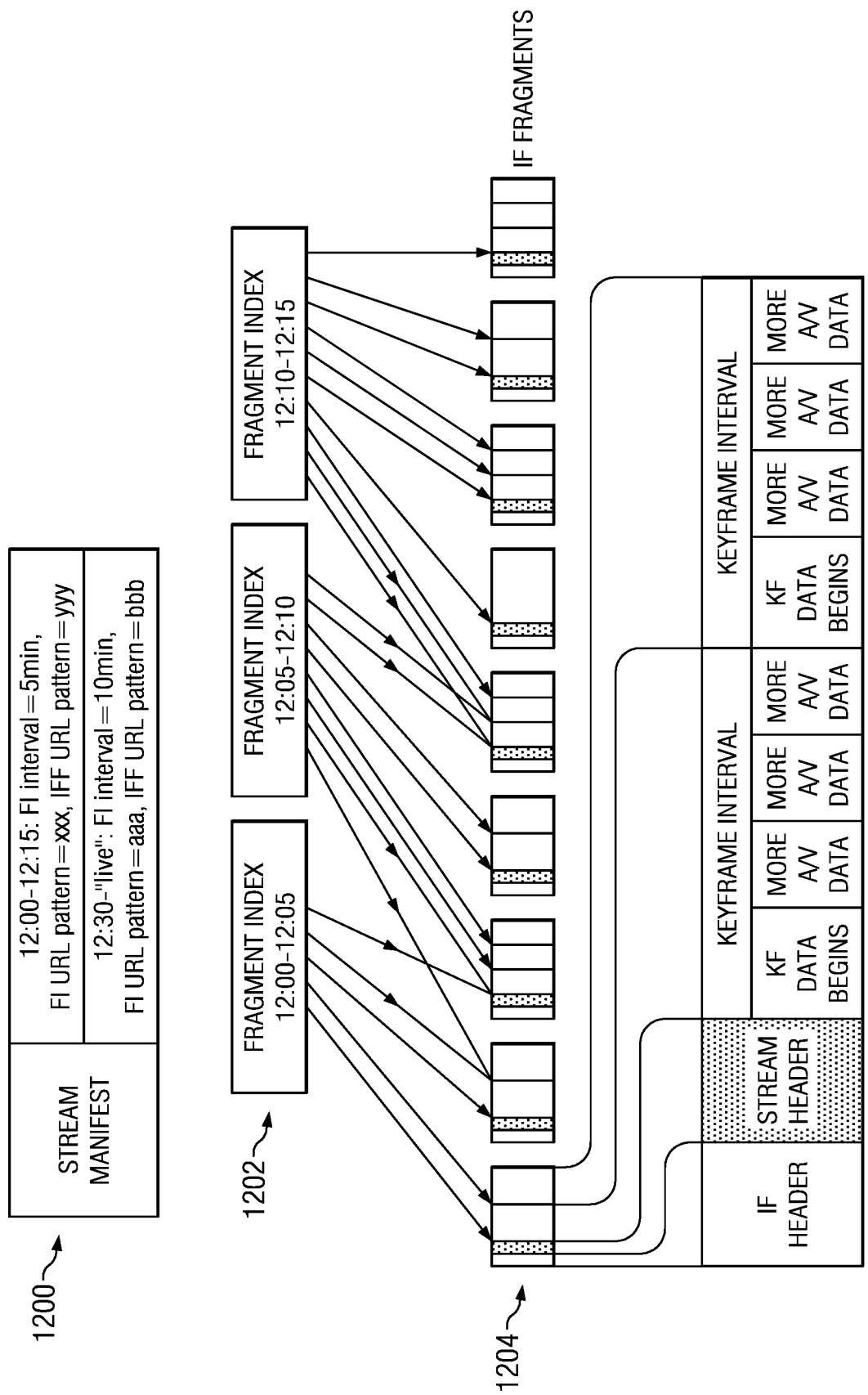
FIG. 12 depicts the relationships among the stream manifest, fragment indexes, and fragments.

FIG. 12 depicts the relationship among the stream manifest 1200, fragment index 1202 and fragments 1204. As noted above, the edge server process preferably only needs to know how to construct the stream manifest URL directly. The stream manifest preferably embeds the actual patterns to construct the actual "now," "Fragment," and "Fragment Index" request URLs. In particular, the edge server process, based on metadata, constructs a URL to download the stream manifest, such as the following: "http://${manifest-server}/manifest/${event}@${Stream-ID}-{p,b}". The "${manifest-server}" comes from metadata, while "${event}" and "${Stream-ID}" come from the request URL. For VOD, the edge server process is also provisioned via metadata with the patterns necessary to parse the event, angle, bit rate, and Stream-ID from a Stream Name.

The "Now" request is simply constructed as "http://${archiver-domain}/${Storage-prefix}/${prefix}@${Stream-ID}-{p,b}/now". Here, the entire "prefix" from the stream name is used. The archiver-domain is a domain name that resolves to the currently active set of Archivers associated with the stream "${prefix}@${Stream-ID}-{p,b}" in the stream manifest. A "Fragment Index" request is constructed as "http://$ Storage-domain|archiver-domain}/${Storage-prefix}/${prefix}@ ${Stream-ID}-{p,b}/${index_epoch_time/indexBucketSize}/index. ${index_epoch_time}". The "indexBucketSize" is specified in the stream manifest and is used to prevent directories from getting excessively large for a long-running stream. The edge server process substitutes for the values involving "index_epoch_time" and "indexBucketSize". Archiver or Stream Manifest Manager will construct the rest of the URL with substitution points for these two values. This allows the format to be extended (e.g., to introduce a hash of the stream name) without requiring any edge server process changes. A "Fragment" request is constructed as: "http://${Storage-domain|archiver-domain}/${Storage-prefix}/${prefix}@${Stream-ID}-{p,b}/${fragment_number/fragmentBucketSize}/fragment. ${fragment numbed}". Again, the "fragmentBucketSize" is specified in the Stream Manifest, and the entire URL other than the values involving "fragment_number" and "fragmentBucketSize" is constructed in the stream manifest.

The edge server process needs some method to find a key frame around a desired "seek time." The fragment indexes provide this seek information to the edge server process. Each fragment index file preferably contains index information covering a fixed amount of time. The exact interval is stored in the stream manifest for each indexInfo range. The desired seek time (epoch time) can be rounded down to a nearest interval boundary to find the fragment index to request. To simplify the lookup process, the offset into the index for any given seek time within the index's time span can be computed approximately using a "minKeyFrameInterval" parameter from the stream manifest, as is illustrated in FIG. 13. By bucketing the indexing in this way, a given key frame which lasts much longer than minKeyFrameInterval may need to be repeated multiple times. A stream also may contain some small additional number of key frames which are faster than minKeyFrameInterval, e.g., due to a rounding effect on the time or due to scene detection by the encoder. Rather than just skipping these additional key frames, the approach allows for additional index slots to be consumed in a "leaky bucket" fashion, according to the "indexFuzziness" stream manifest parameter. The edge server process reads "indexFuzziness" records and searches the key frame times to find a best key frame for a request. Because the number of items to search is a small constant, a simple linear search is adequate. If the indexFuzziness parameter is exceeded, key frames may be dropped greedily by recording each key frame that fits in the index and dropping those that do not as the key frames are discovered. In addition, preferably the first several slots (according to the "keyFrameIntervalOverlap" stream manifest parameter) are reserved for the last several key frames from a previous fragment index; this may be useful if the edge server is trying to find the key frame interval which contains the seek time.

The following provides additional details regarding the RTMP Puller component.

As noted above, incoming media packets are demuxed into an Intermediate Format. The muxer component (residing closer to or on the edge) muxes the packets to the desired target format before the packets reach the end clients. FIG. 5 above depicts the flow of media packets into and out of the framework. In one embodiment, the ingress and egress format is in Adobe FLV, but this is not a limitation, as noted. In this example implementation, the encoder pushes the CDN customer content into the Flash entry point (EP). The RTMP Puller then pulls the content from the Flash EP and passes the data to the demuxer. Demuxer converts that incoming source format (e.g., FLV) to IF fragments before injection into the Archiver sub-network.

The above-described embodiments provide a format-agnostic streaming architecture that utilizes an HTTP edge network for object delivery.

The above-described approach provides numerous advantages. The techniques described herein facilitate the delivery of high definition video and audio (including advanced video features, such as DVR) over an HTTP-edge network which, in a typical CDN, is the network that has the largest footprint. By implementing the techniques, a provider can leverage its existing HTTP-based servers instead of having to implement and maintain dedicated server networks to support multiple third party runtime environments. Moreover, because the delivery is HTTP-based, the content can be seamlessly delivered to clients operating across fixed line and mobile environments. No special client software is required, as the HTTP proxy (that responds to the client request) dynamically re-assembles fragments that it obtains and serves the requested content via HTTP. Further, because delivery within the set of interconnected machines of the CDN preferably takes advantage of an intermediate format, the network can ingest content in one format yet serve it in another, all while preserving single or multi-bitrates and DVR-like functionality. Thus, for example, the network may take in live RTMP packets and serve the content as an FLV progressive download. Preferably, each IF fragment of the stream is a separate object for the HTTP proxy that can be accessed, cached, and served via HTTP. According to the scheme, the stream is broken up into many small objects (fragments), with each fragment managed separately.

The network is not limited for use with any particular runtime environment such as Flash. By leveraging the approach as described, a single set of content sources can be leveraged for different device capabilities. Thus, the techniques as described herein include dynamically transmuxing content to other file formats in a manner that is transparent to the content provider and the end user.

The intermediate format may be based on or adapted from any convenient multimedia file format that can be used delivery and playback of multimedia content. These include, without limitation, fragmented mp4, protected interoperable file format (piff), and others. More generally, any linked list-based file format may be used.

Preferably, the CDN service provider provides an extranet (a web-based portal) through which the stream delivery is provisioned.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

Having described our invention, what we claim is as follows:

1. A system, comprising:

an edge machine comprising a processor, and computer memory holding computer program instructions executed by the processor; and a translator machine located remotely from the edge machine and comprising a processor, and computer memory holding computer program instructions that comprise an HTTP proxy, and a translator process, the HTTP proxy and the translator process interacting with one another over a shared memory in the translator machine;

wherein the HTTP proxy is configured to perform partial object caching (POC) of raw data fragments comprising a requested stream, and wherein the translator process is configured to generate and provide a stream manifest, an index and one or more media fragments to facilitate delivery by the edge machine of the requested stream;

wherein information comprising the requested stream is stored in association with the translator machine in an intermediate format that differs from a target format of the requested stream as delivered by the edge machine;

wherein, in response to receipt at the HTTP proxy of the translator machine of a request for the stream manifest issued from the edge machine and that the HTTP proxy can service directly, the HTTP proxy returns the stream manifest; and wherein, in response to receipt at the HTTP proxy of the request for the stream manifest that the HTTP proxy cannot service directly, the HTTP proxy forwards the request together with a unique host header to the translator process over a localhost connection and the shared memory, wherein a response returned to the HTTP proxy by the translator process also carries the unique host header.

2. The system as described in claim 1 wherein the intermediate format is a fragmented MP4 format.

3. The system as described in claim 1 wherein the intermediate format comprises the stream manifest, a set of one or more fragment indexes (FI), and a set of IF fragments, each IF fragment identified by a fragment number and comprising a header and a payload.

4. The system as described in claim 3 wherein the stream manifest comprises stream metadata, and information about the one or more fragment indexes.

5. The system as described in claim 4 wherein a fragment index comprises information identifying a key frame associated with a given time slice, a key frame-to-fragment number mapping, a key frame-to-time mapping, and a key frame-to-byte offset in a key frame-to-fragment number mapping.

6. The system as described in 4 wherein fragment numbers associated with a set of IF fragments are consecutive.

7. The system as described in claim 1 wherein the information identified in the request is one of: the stream manifest, the index, and a media fragment.

8. The system as described in claim 1 wherein the unique host header ensures that content delivered from the HTTP proxy to the edge machine is associated with a particular entity.

* * * * *